(12) United States Patent
Imade et al.

(10) Patent No.: US 6,633,526 B1
(45) Date of Patent: Oct. 14, 2003

(54) DATA RECORDING METHOD, DATA REPRODUCING METHOD AND DATA RECORDING MEDIUM

(75) Inventors: Shinichi Imade, Iruma (JP); Seiji Tatsuta, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 352 days.

(21) Appl. No.: 09/632,109

(22) Filed: Aug. 3, 2000

(30) Foreign Application Priority Data

Aug. 5, 1999 (JP) .......................................... 11-222508

(51) Int. Cl.$^7$ ............................................... G11B 20/10
(52) U.S. Cl. .................................... 369/59.1; 369/59.23
(58) Field of Search ......................... 369/112.17, 44.26, 369/59.26, 59.1, 14, 275.1, 59.23; 235/454, 462.01, 472.03, 494; 714/752; 283/93

(56) References Cited

U.S. PATENT DOCUMENTS

| | | | | |
|---|---|---|---|---|
| 5,056,080 A | * | 10/1991 | Russell | ...................... 369/100 |
| 5,124,536 A | * | 6/1992 | Priddy et al. | ................ 235/432 |
| 5,491,678 A | * | 2/1996 | Maeda et al. | ............ 369/59.26 |
| 5,541,396 A | * | 7/1996 | Rentsch | ....................... 235/454 |
| 5,577,774 A | * | 11/1996 | Morikawa et al. | ............ 283/93 |
| 5,736,723 A | * | 4/1998 | Clarke et al. | ................ 235/456 |
| 5,866,895 A | | 2/1999 | Fukuda et al. | ............. 235/494 |
| 5,896,403 A | | 4/1999 | Nagasaki et al. | ........... 714/752 |
| 6,119,937 A | * | 9/2000 | Wang et al. | ................ 235/454 |

* cited by examiner

*Primary Examiner*—William Korzuch
*Assistant Examiner*—Kim-Kwok Chu
(74) *Attorney, Agent, or Firm*—Frishauf, Holtz, Goodman & Chick, P.C.

(57) ABSTRACT

In recording dots corresponding to the data to be recorded in the record transmission path, the dots are recorded optically readably so that the recorded data may be reproduced by using two-dimensional interference from the adjacent dots. In reproducing data, after the code image has been processed by equalization in the PR-equalization portion, and simultaneously based upon the reading point position information detected in the reading point calculation portion, the values in the reading points are judged, and in the decoding portion, these read data are judged and decoded based upon the predetermined decoding rules, and they are converted into the original data.

15 Claims, 16 Drawing Sheets

⟨DEFINITION EXPRESSION⟩

| | | |
|---|---|---|
| INPUT DATA | $\{a_i \mid a_i \in 0,1\}$ | $i=0,1,2,3\cdots$ |
| DATA AFTER PRECODING | $\{b_i \mid b_i \in 0,1\}$ | $i=0,1,2,3\cdots$ |
| DETECTED VALUES OF RECORDING CODES | $\{c_i \mid c_i \in 0,1,2\}$ | $i=0,1,2,3\cdots$ |
| DATA OF DETECTED VALUES AFTER JUDGMENT | $\{a_i' \mid a_i \in 0,1\}$ | $i=0,1,2,3\cdots$ |

⟨PRINCIPLE OPERATION EXPRESSION⟩

$$b_i = a_i \oplus b_{i-1} \quad \cdots (1)$$
$$c_i = b_i + b_{i-1} \quad \cdots (2)$$
$$a_i' = [c_i] \bmod 2$$
$$\quad = b_i \oplus b_{i-1} \quad \cdots (3)$$
$$\quad = [a_i \oplus b_{i-1}] \oplus b_{i-1} \quad \cdots (4)$$
$$\quad = a_i \oplus [b_{i-1} \oplus b_{i-1}] \quad \cdots (5)$$
$$\quad = a_i \quad \cdots (6)$$

$\oplus$: EXCLUSIVE LOGIC SUM, AND mod2 REPRESENTS A REMAINDER OPERATION OF MODULO 2

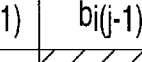
F I G. 12
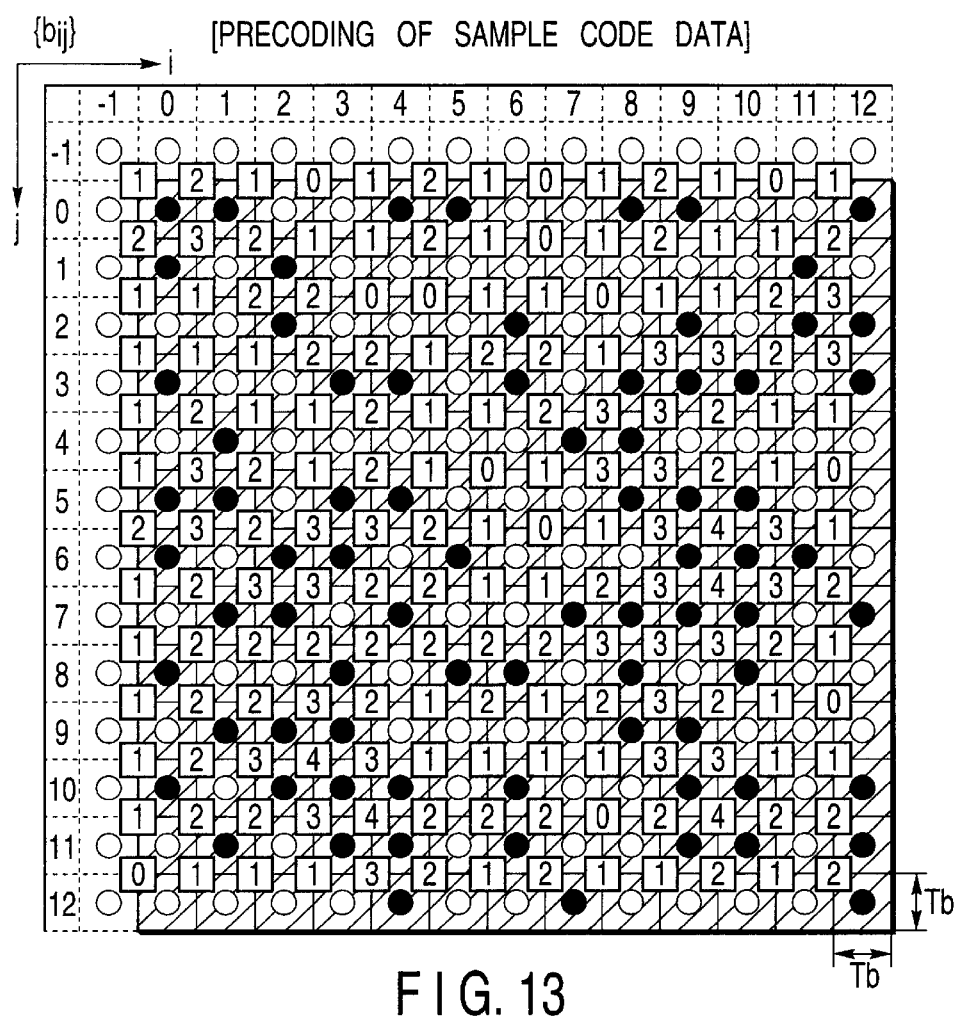
F I G. 13

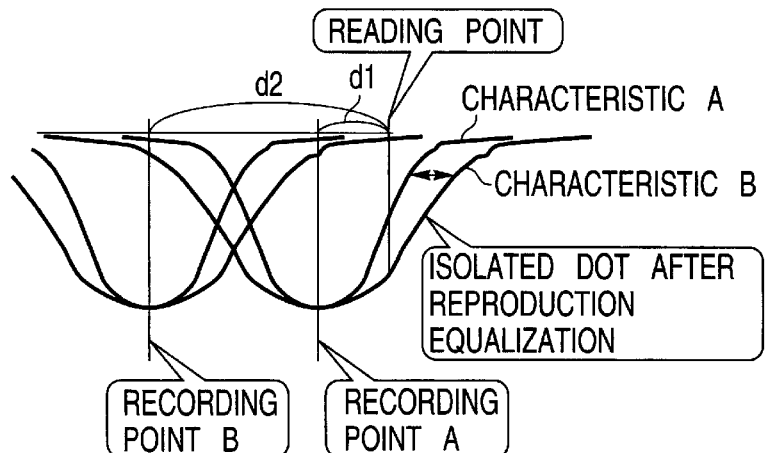
FIG. 21  LUMINANCE CROSS-SECTION OF ISOLATED DOT AFTER PR-EQUALIZATION
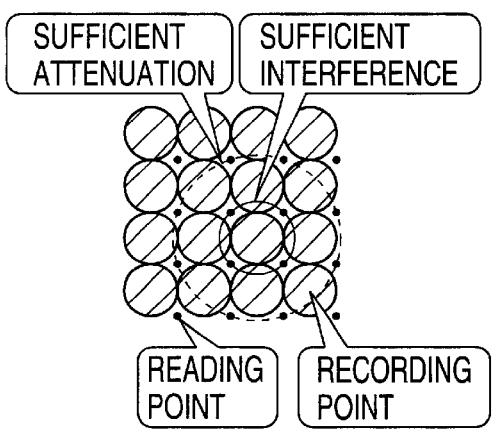
FIG. 22
FIG. 23
FIG. 24
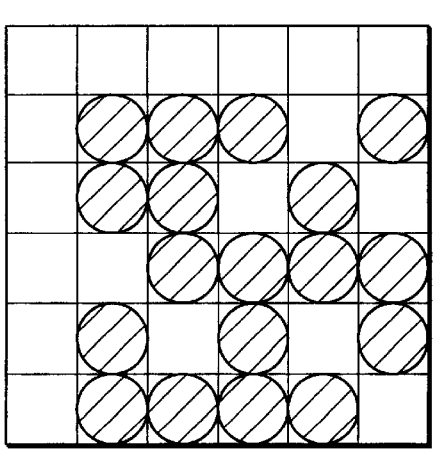
FIG. 25
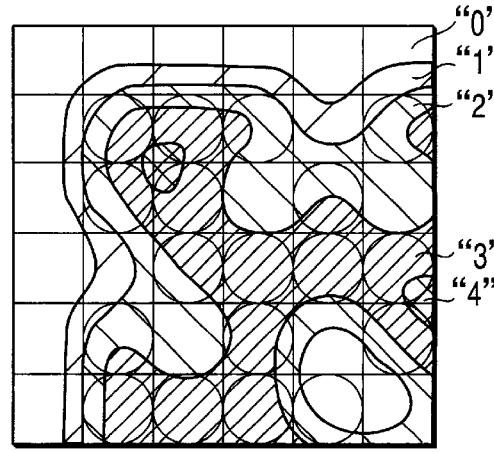
FIG. 26

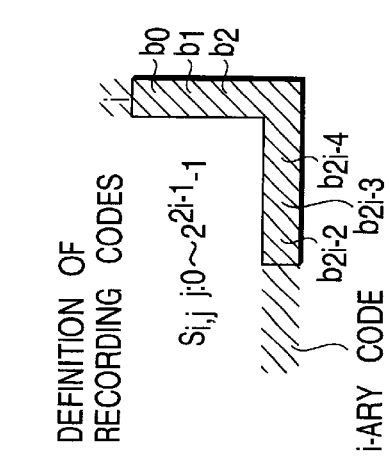
FIG. 30
FIG. 31
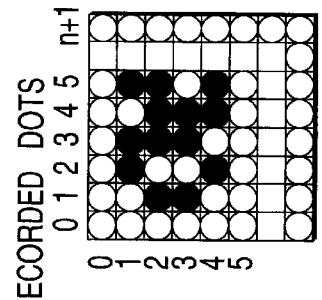
FIG. 32
FIG. 33

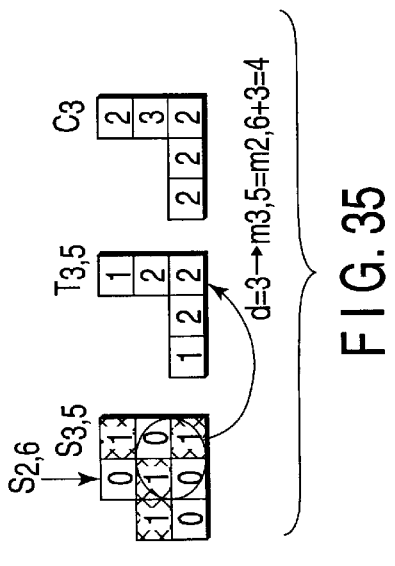
FIG. 34
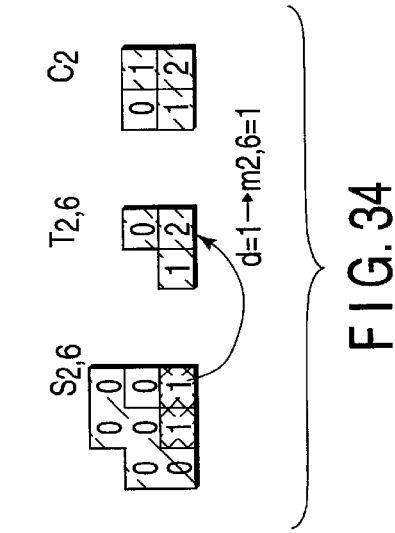
FIG. 35
FIG. 37

FIG. 36

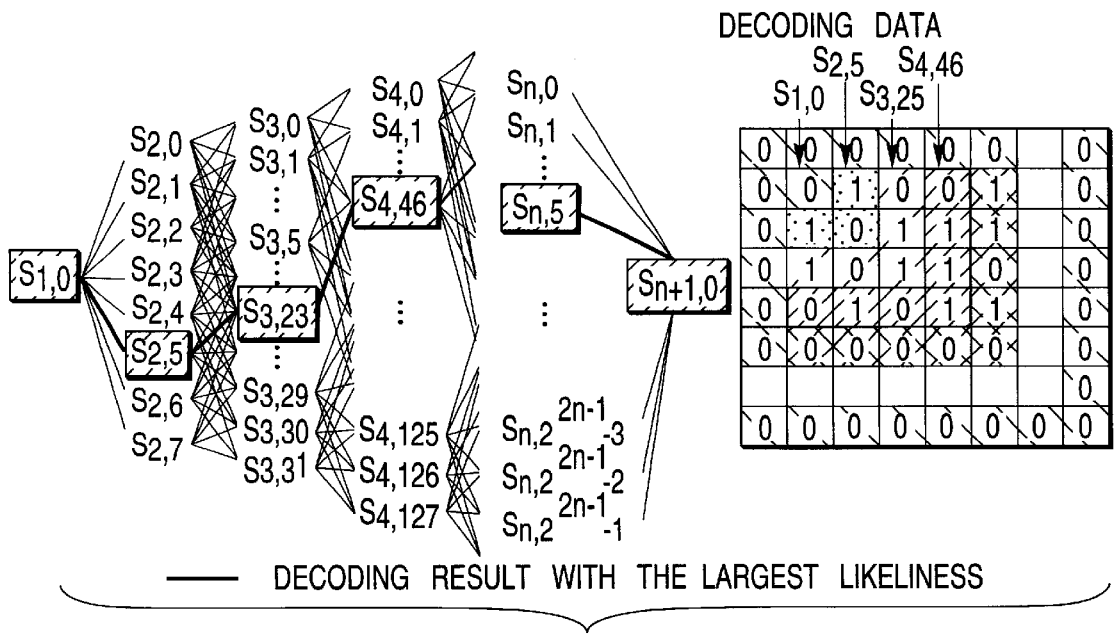
F I G. 41
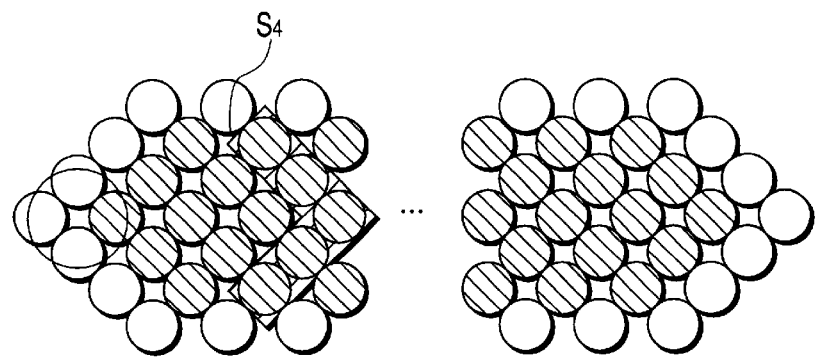
F I G. 42
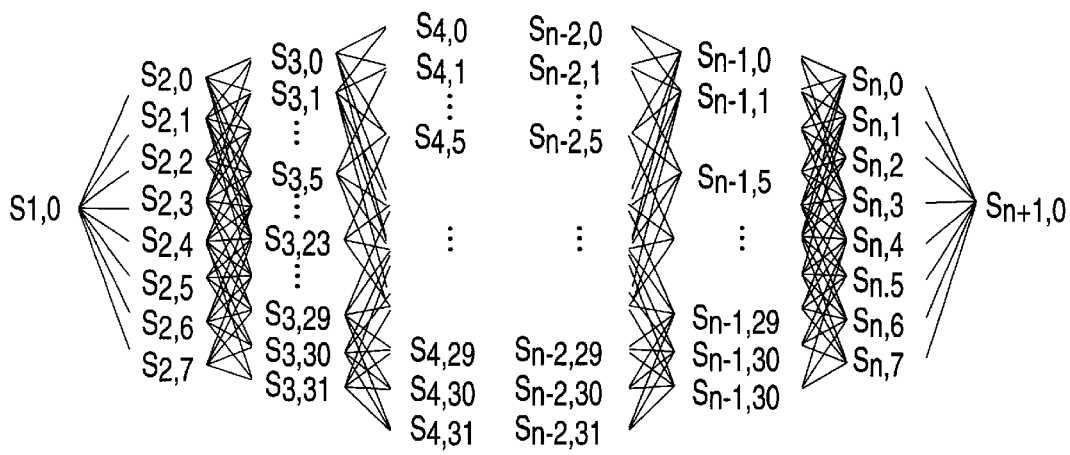
F I G. 43

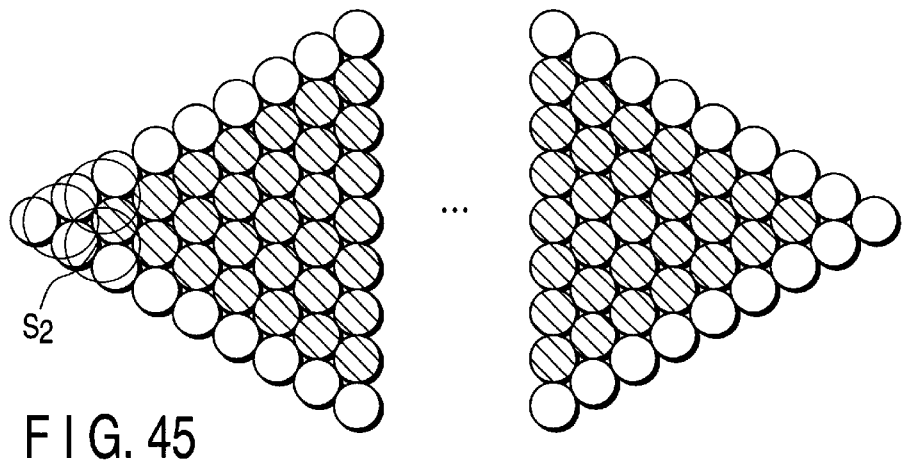
FIG. 44
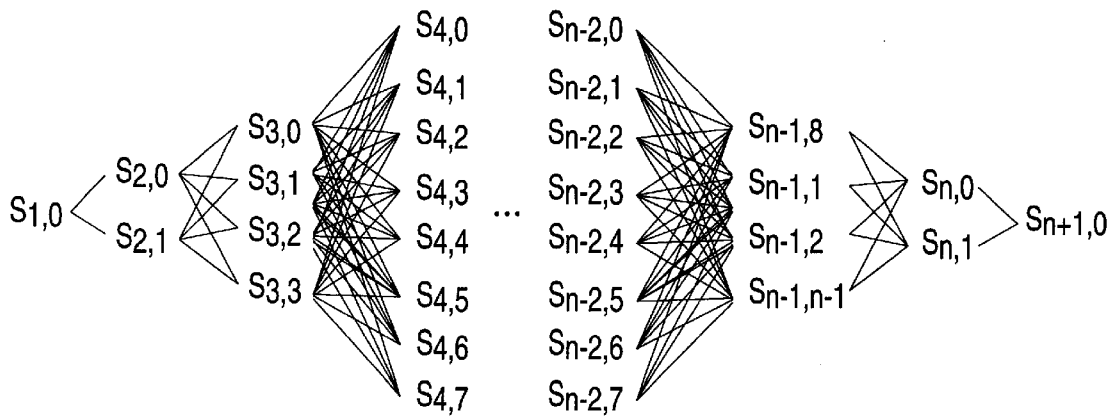
FIG. 45
FIG. 46

DATA RECORDING METHOD, DATA REPRODUCING METHOD AND DATA RECORDING MEDIUM

CROSS-REFERENCE TO RELATED APPLICATIONS

This application is based upon and claims the benefit of priority from the prior Japanese Patent Application No. 11-222508, filed on Aug. 5, 1999, the entire contents of which are incorporated herein by reference.

BACKGROUND OF THE INVENTION

The present invention relates to a data recording method for recording various data such as voice, picture, text or the like as optically readable dot patterns on a sheet-like recording medium such as paper or the like, and to a data reproducing method for reproducing the data by optically reading dot patterns recorded on this recording medium, as well as to a data recording medium recording these dot patterns as optically readable image.

Conventionally, various data recording method for recording various data such as voice, picture, text or the like as optically readable image on a sheet-like recording medium such as paper or the like have been proposed.

This applicant has also proposed, as disclosed U.S. Pat. No. 5,896,403, U.S. Pat. No. 5,866,895 and the like, a data recording method, a data reproducing method and a data recording medium using a dot code which makes it possible to read a large volume of data manually and easily by inventing a new format utilizing fine dot patterns in the order of about 60 $\mu$m to 80 $\mu$m located in the two dimensions as shown in FIG. 1.

FIG. 2 shows a concrete example of the format of the dot code basically composed of a plurality of blocks located adjacently in the two dimensions.

That is, each block is composed of an area of data dots 1, markers 2 and a block address pattern 3. Here, the area of data dots 1 is an area where data divided per block of the data to be recorded exist in a predetermined two dimensional arrangement as data dots 1 which are an image of dots having reflection characteristics corresponding to the value "1" or "0" thereof, for example, black/white, same phase/inverted phase or the like. The markers 2 are used to find a reference point for reading the data dots 1 and are composed of a predetermined number of consecutively arranged black dots located at the four corners of each block. The block address pattern 3 is a pattern showing the address of the block located between the markers so that the plurality of different blocks may be identified when reading. Moreover, this block address pattern 3 includes an error detection or error correction code.

Therefore, according to this dot code, even if the whole area of this dot code is larger than the image pickup field of the data reader, that is, even if the data reader can not pick up the dot code in one shot, the whole original data can be reconstructed from the data contained in each block by detecting each address allocated to each block together with the data dots contained in each block per block and rearranging the blocks in accordance with the detected addresses. Accordingly, not only a large volume of data on pages or the like can be recorded practically, but also these data can be read easily even by means of manual operation, and therefore, the wider use of this dot code is expected in future.

However, with respect to the technology of recording or reproducing data by the dot code including fine dot patterns, it has been found by the researches thereafter that the technology still has several new points to be improved as described below.

That is, when the dot code is recorded, only the printing technology is used, and since the recorded dot code itself must be always printed with a constant quality in order to read the dot code always with stability, the resolution in recording the dot code has its limit as a matter of course, resulting in an inevitable reduction in the recording density of the dot code.

On the other hand, if the dot code can be recorded with a possible smallest area without allocating a large area on pages or the like, various beneficial effects such as an advantageous layout on pages or the like can be obtained. And therefore, there is also a desire to reduce the dot code in area and record it.

If the recording density is increased to the limit of the printing technology according to this desire, the reading resolution of the dot code reader is inevitably increased, for example, a high definition image pickup system is required, and the processing with respect to the reading becomes more expensive, resulting in an increase in cost of the reader.

Therefore, it is an important problem to be solved to be able to record and reproduce data with a higher recording density of the dot code, but with a possible lowest reading resolution of this dot code on the reader side.

Generally, a method of reading a high density recorded dot code by increasing the image pickup magnification of the optical system without increasing the reading resolution on the reader side is also conceivable, however, in this case, since the area of the dot code coming within the image pickup field becomes smaller, and since the reader and the dot pattern must be positioned more precisely, there is a new disadvantage that this method is not suitable particularly for a manual operation.

Now, this phenomenon will be described in detail with reference to FIGS. 3 to 6. For example, as shown in FIG. 3, if the width $W_c$ of the image pickup area 4 in the image pickup portion is 8 mm, and if the width $W_d$ of the dot code is 4 mm, the permissible snaking width W is $W_c-W_d$=4 mm. Usually, since the permissible snaking width in the order of 6 mm is required when the dot code is scanned by manual operation, countermeasures such as recording the identical data twice by arranging the dot code as shown in FIG. 4 or the like are taken. By this, the permissible snaking width W is 8 mm, however, the occupancy area of the dot code is doubled, and if the occupancy area of the original dot code is 4S, the occupancy area thereof is 8S.

Now, if the dot code is recorded with a double recording density both in length and width, the occupancy area of the dot code is ¼ or S, and if the dot code is read by doubling the magnification of the optical system in order to obtain the same reading resolution, $W_c$ is 4 mm, $W_d$ is 2 mm, and therefore, the permissible snaking width W is 2 mm, as shown in FIG. 5. Accordingly, in order to secure a permissible snaking width of 6 mm, it is necessary to record data three times as shown in FIG. 6, however, since the occupancy area thereof is 3S, the substantial recording area is only ⅜ compared with a case as shown in FIG. 4 in spite of a quadrupled recording density. That is, by increasing the reading resolution corresponding to the recording density, the operability by a manual scanning is impaired considerably, and if a redundant recording is made in order to prevent this, the occupancy area can not be reduced with the same efficiency even with an increased recording density.

BRIEF SUMMARY OF THE INVENTION

The present invention is made in consideration of the above-described points, and has an object of providing a data recording method and a data reproducing method as well as a data recording medium being adapted to read fine dots arranged and recorded in the two dimensions so as to be readable optically with a high density particularly without increasing the reading resolution on the reader side and to reproduce data recorded as dots precisely.

According to a first aspect of the present invention, there is provided a data recording method for recording data to be recorded as an optically readable image on a recording medium by letting "1" or "0" correspond to existence or non-existence of a fine dot having predetermined reflection characteristics respectively and by arranging the dot corresponding to the data according to a predetermined format in the two dimension, the data recording method comprising the steps of:

inputting data to be recorded; and recording dots corresponding to the inputted data optically readably so that the data may be reproduced by using a two dimensional interference from the adjacent dots.

According to a second aspect of the present invention, there is provided a data reproducing method for reproducing data by reading fine dots having predetermined reflection characteristics from a recording medium on which data to be recorded is recorded as an optically readable image by letting "1" or "0" correspond to existence or non-existence of the dot respectively and by arranging the dot corresponding to the data according to a predetermined format in the two dimension, the data reproducing method comprising the steps of:

picking up the dots from the recording medium by a manual scanning operation; and reproducing the data from the data of the dots obtained by the pickup by using a two-dimensional interference of the dots located adjacently in the two dimension.

According to a third aspect of the present invention, there is provided a recording medium on which data to be recorded are recorded as an optically readable image by letting "1" or "0" correspond to existence or non-existence of a fine dot having predetermined reflection characteristics respectively and by arranging the dot corresponding to the data according to a predetermined format in the two dimension, the recording medium comprising:

a location area for locating the dots; and the dots recorded within the location area, wherein the dots are recorded optically readably so that the recorded data may be reproduced by using a two-dimensional interference from the adjacent dots.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 12 is a view for illustrating three dots adjacent to the dot to be aimed at after preceding;

FIG. 13 is a view showing the relation of the series of the read values in the reading judgment portion in FIG. 9 with the recorded dots;

FIG. 21 is a view for illustrating the characteristics of a filter used for PR-equalization;

FIGS. 22, 23, and 24 are views showing different examples of the dot code format and the PR-equalization characteristics respectively;

FIG. 25 is a view showing a picture of the recorded dots;

FIG. 26 is a view showing the picture of the recorded dots in FIG. 25 interfered by the low-pass characteristics due to a mainly optical defocus of the recording/reproduction system;

FIG. 30 is a view showing an example of the data series of the recorded data and the result of multinary judgment;

FIG. 31 is a view showing the recorded dots corresponding to the data series of the recorded data in FIG. 30;

FIG. 32 is a view showing the definitions of the recording codes;

FIG. 33 is a view showing the combinations in which the secondary codes appear;

FIG. 34 is a view for illustrating the metric with respect to the secondary code $S_{2,6}$;

FIG. 35 is a view for illustrating the metric in the transition from $S_{2,6}$ to $S_{3,5}$;

FIG. 36 is a view showing several metrics with respect to the tertiary codes;

FIG. 37 is a view showing the metrics stored in the pass metric storage portion as a result of calculating all the pass metrics with respect to the tertiary codes;

FIG. 41 is a view for illustrating the code series of the maximum likelihood;

FIG. 42 is a view showing the dot code having a different format as a variant of the third embodiment;

FIG. 43 is a view showing a trellis generated by the decoded codes of the maximum likelihood;

FIG. 44 is a view for illustrating a selectable pass when the transition from an odd number to another odd number and from an even number to another even number is prohibited in the transition from the code $S_i$ to the code $S_{i+1}$;

FIG. 45 is a view showing the dot code having a format in which data dots are arranged in a triangle; and FIG. 46 is a view showing a trellis generated based upon the results of the data reading by means of a quarternary judgment.

DETAILED DESCRIPTION OF THE INVENTION

Now, prior to describing the embodiments of the present invention, the concept of a partial response method employed basically in the data recording method according to the present invention will be described in detail for assisting in the understanding of the present invention.

Figure 1:
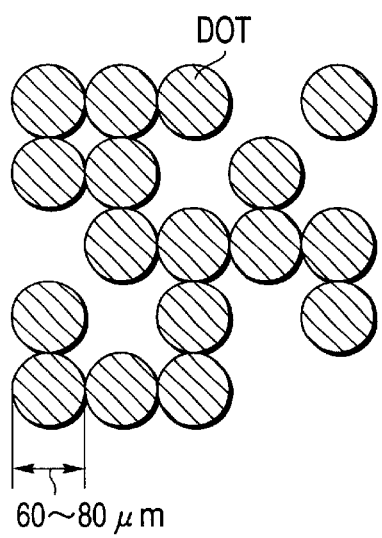
FIG. 1 is a view showing the size of dots composing the conventional dot code.
Figure 2:
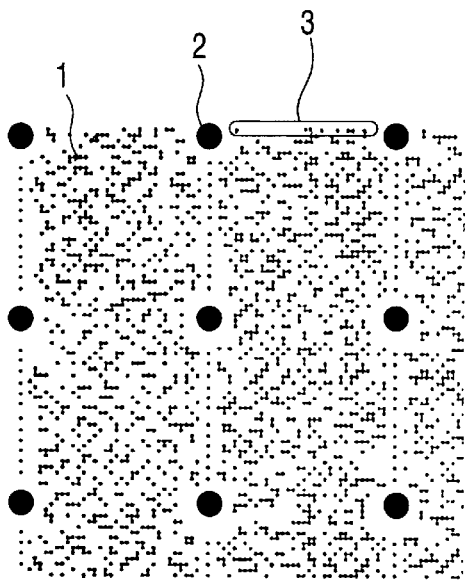
FIG. 2 is a view showing a concrete example of the format of the conventional dot code.
Figure 3:
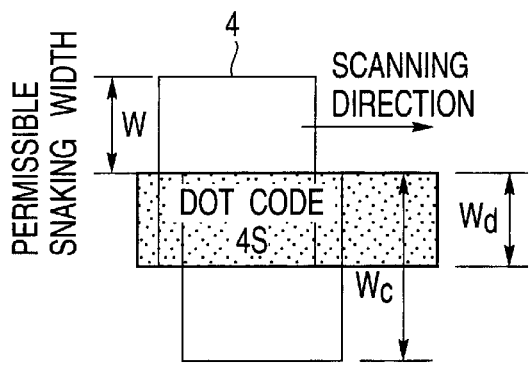
FIGS. 3, 4, 5, and 6 are views showing the relation of the dot code with the image pickup area and the permissible snaking width.
Figure 4:
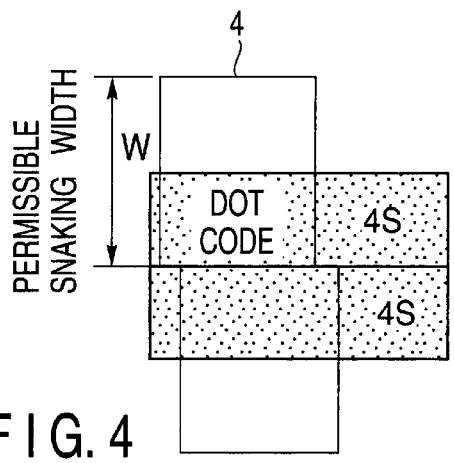
Figure 5:
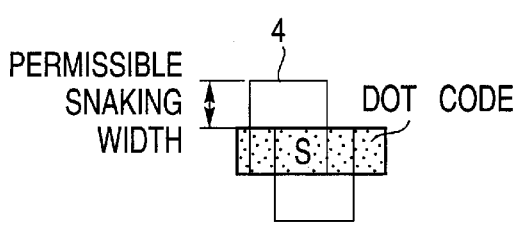
Figure 6:
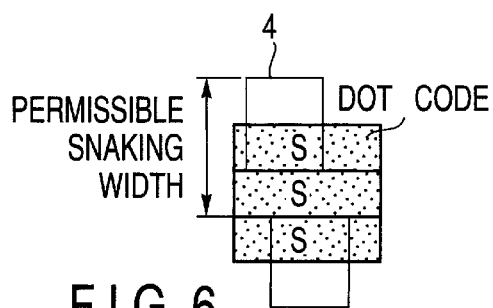
Figure 7:
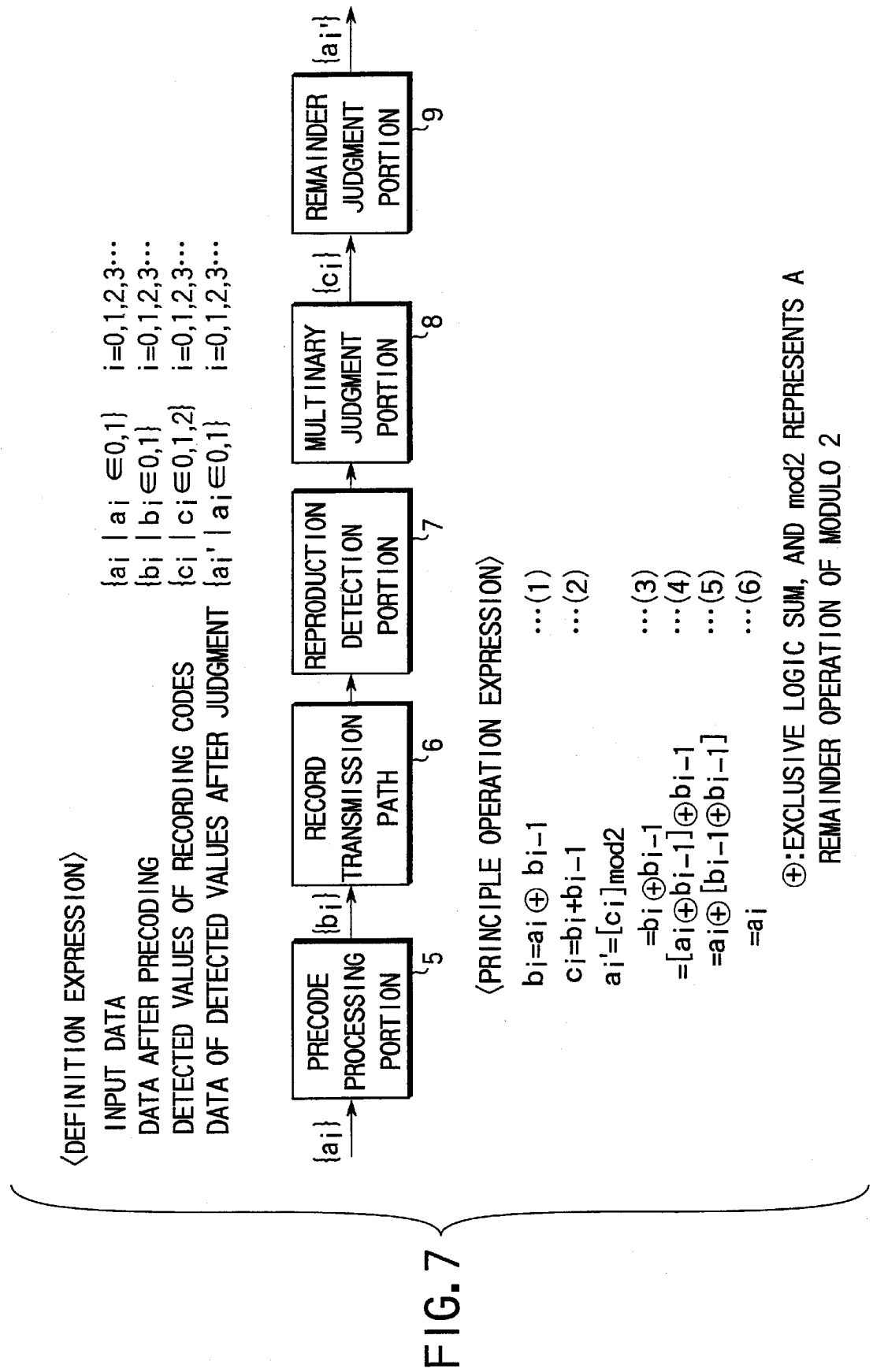
FIG. 7 is a view showing a block composition diagram, a definition expression and a principle operation expression for explaining the principles of a data coding and data recording and reproducing methods in case of applying a partial response one-dimensionally.

FIG. 7 is a block composition diagram for illustrating the principles when the partial response (hereafter referred to as PR) is applied one-dimensionally.

The digitized input data series $\{a_i\}$ is a data series having a value of "0" or "1", as shown in the definition expression.

This input data series $\{a_i\}$ is inputted first in the precode processing portion 5, is operated as shown in the principle operation expression (1), and is outputted as a data series $\{b_i\}$. That is, the initial value $b_0$ is defined as equivalent to $a_0$, the values from $b_1$ on are operated (equivalent to defining the initial value $b_{-1}$ as 0 and operating the values from $b_0$ on), and the exclusive or (mod2 remainder operation) of the input data $a_i$ and $b_{i-1}$ outputted just before is found, thereby generating $b_i$.

This data series $\{b_i\}$ is recorded and reproduced via a record transmission path 6, and in this example two adjacent data values $b_k$ and $b_{k-1}$ interfere each other by passing through the record transmission path 6, and are detected as a convolved value in a reproduction detection portion 7, thereby obtaining a detected value. This detected value is inputted in a multinary judgment portion 8, and, in this example, a ternary judgment is made (principle operation expression (2)). Here, in order to realize an operation shown in the principle operation expression (3), a remainder operation of mod2 is performed with respect to multinary data to perform conversions such as "0"→"0", "1"→"1", and "2"→"0" in a remainder judgment portion 9. Theoretically, by applying a mod2 remainder operation to adjacent data in the precode processing portion 5 and by applying a mod2 remainder operation again to multinary detected values convolved in the record transmission path 6 and obtained in the reproduction detection portion 7, the mod2 operation will be applied twice to the adjacent data, and the mod2 remainder operations having an even numbered frequency will be equivalent to an effect of restoring the original data. That is, as shown in the development of the principle operation expression (4) and the principle operation expression (5), the original input data series $\{a_i\}$ can be obtained.

Figure 8:
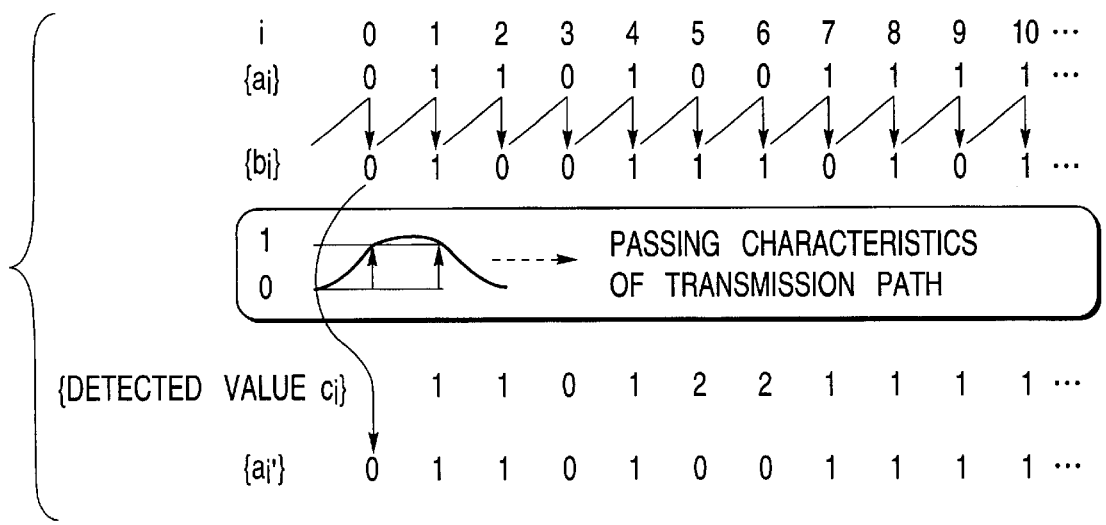
FIG. 8 is a view showing a status example of actual data in the data coding and the data recording and reproducing methods in FIG. 7.

FIG. 8 is a view showing this by an actual data example.

The above is the description of the basic principles of the method of coding, recording and reproducing data by partial response.

Moreover, a method of restoring the original data by using detected values obtained by convolving adjacent data by the record transmission path 6 without applying a precode is conceivable. In this case, for example, with the value of the initial value $a_0$ being known, by subtracting this value from the added sum data as a result of convolution the adjacent data, calculating $a_1$, and repeating this operation sequentially, the original data may be unraveled. However, in this method, there is a practically fundamental defect that even if only one result is wrong, this will cause chain-reacting errors subsequently. Therefore, as in this example, the defect is eliminated by a precode processing.

Now, the embodiments of the present invention will be described.

First Embodiment

First, the first embodiment of the present invention will be described with reference to FIGS. 9 to 15.

Figure 9:
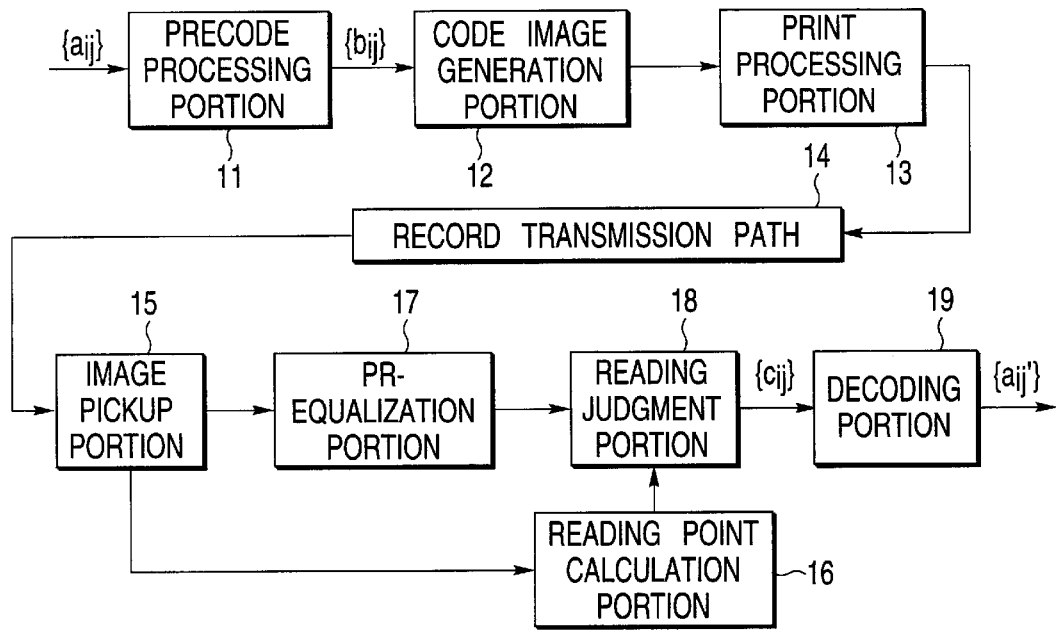
FIG. 9 is a block composition diagram of a system to which the data recording method, the data reproducing method and the data recording medium according to a first embodiment of the present invention are applied.

As shown in FIG. 9, the system to which the data recording method and the data reproducing method as well as the data recording medium comprises a recording system including a precode processing portion 11, a code image generation portion 12 and a print processing portion 13, and a reproduction system including a record transmission path 14, an image pickup portion 15, a reading point calculation portion 16, PR-equalization portion 17, a reading judgment portion 18, and a decoding portion 19.

This FIG. 9 is a basic function block diagram when the one-dimensionally applied principle shown in the description of the concept of the partial response is adapted to the two dimensional dot code, and here, the basic functions thereof will be described.

Figures 10, 11:
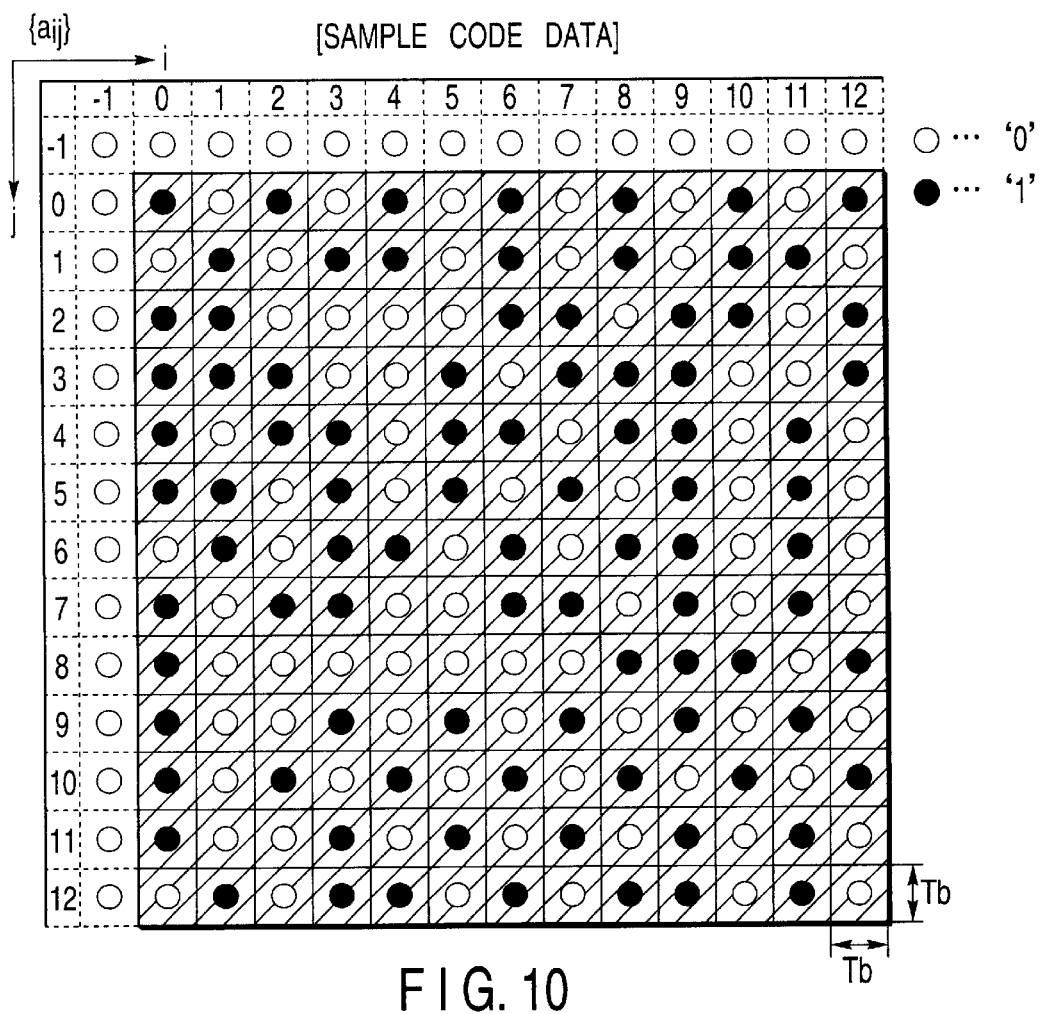
FIG. 10 is a view showing an example of the two dimensional dot series as one example of the input data series.
FIG. 11 is a view showing a dot to be aimed at in the data series inputted in the precode processing portion in FIG. 9.

In order to ease a basic understanding, they will be described by letting the input data $a_{ij}$ correspond to the dot code of an actual recording status. As an example of the input data series, an example of the two dimensional dot series is shown in FIG. 10. In this example, the input data are represented as a white dot="0" and as a black dot="1", and they are recorded based upon the recording format recorded in order on the grids.

Each dot shall be represented as a variable of $\{a_{ij}|i, j=-1, 0, 1, 2, 3, \ldots\}$, and as an initial value $\{a_{ij}=0|i=-1\}$, $\{a_{ij}=0|j=-1\}$ is defined. $T_b$ in FIG. 10 represents a pitch between dots or a dot diameter.

Such input data $\{a_{ij}\}$ are inputted in the precode processing portion 11, and, as described in the one dimensional principle description, it is processed by preceding, and a data series $\{b_{ij}\}$ after preceding is outputted. In the precode processing portion 11, by using the value of the dot to be aimed at $a_{ij}$ as shown in FIG. 11 and the values of three dots adjacent to the dot to be aimed at after preceding as shown in FIG. 12, that is, $b_{(i-1)j}$, $b_{i(j-1)}$ and $b_{(i-1)(j-1)}$, an operation based upon the following expression (7) is performed, the input data series $\{a_{ij}\}$ is precoded sequentially, and the data series $\{b_{ij}\}$ is calculated. In this case, as an initial value $\{b_{ij}=a_{ij}=0|i=-1\}$, $\{b_{ij}=a_{ij}=0|j=-1\}$ is defined.

$$b_{ij}=a_{ij}\oplus b_{(i-1)j}\oplus b_{i(j-1)}\oplus b_{(i-1)(j-1)} \qquad (7)$$

($\oplus$ represents an exclusive or.)

The data series $\{b_{ij}\}$ after precoding is inputted in the code image generation portion 12, is converted into a code image according to a predetermined code format, is printed or printed out in the print processing portion 13, and is transmitted via the record transmission path 14 as a recording medium.

Figure 14:
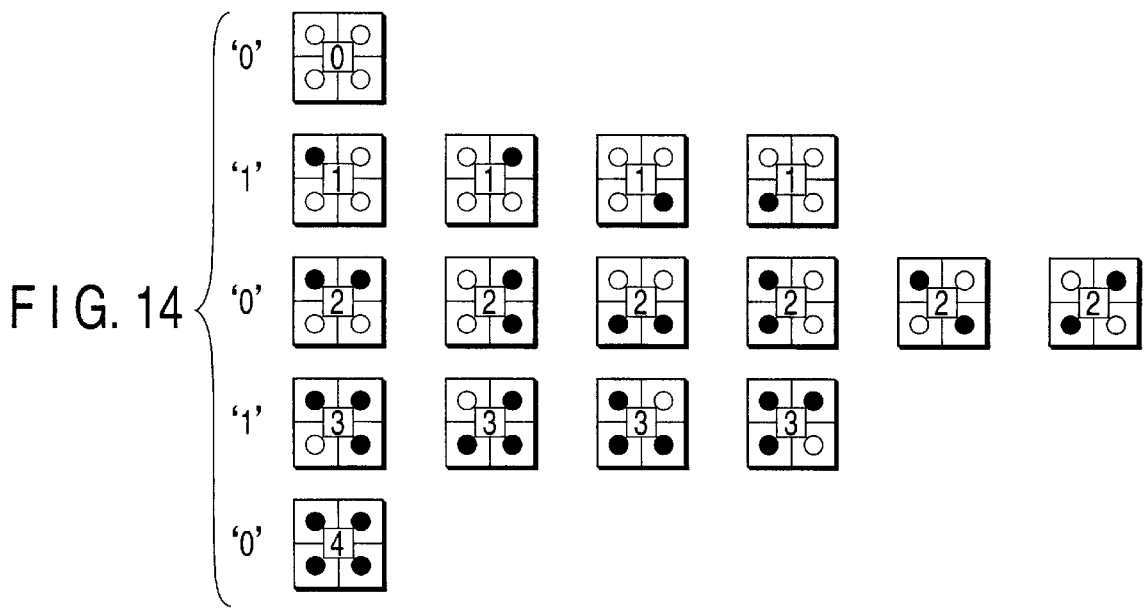
FIG. 14 is a view showing the decoding rules in the decoding portion in FIG. 9.
Figure 15:
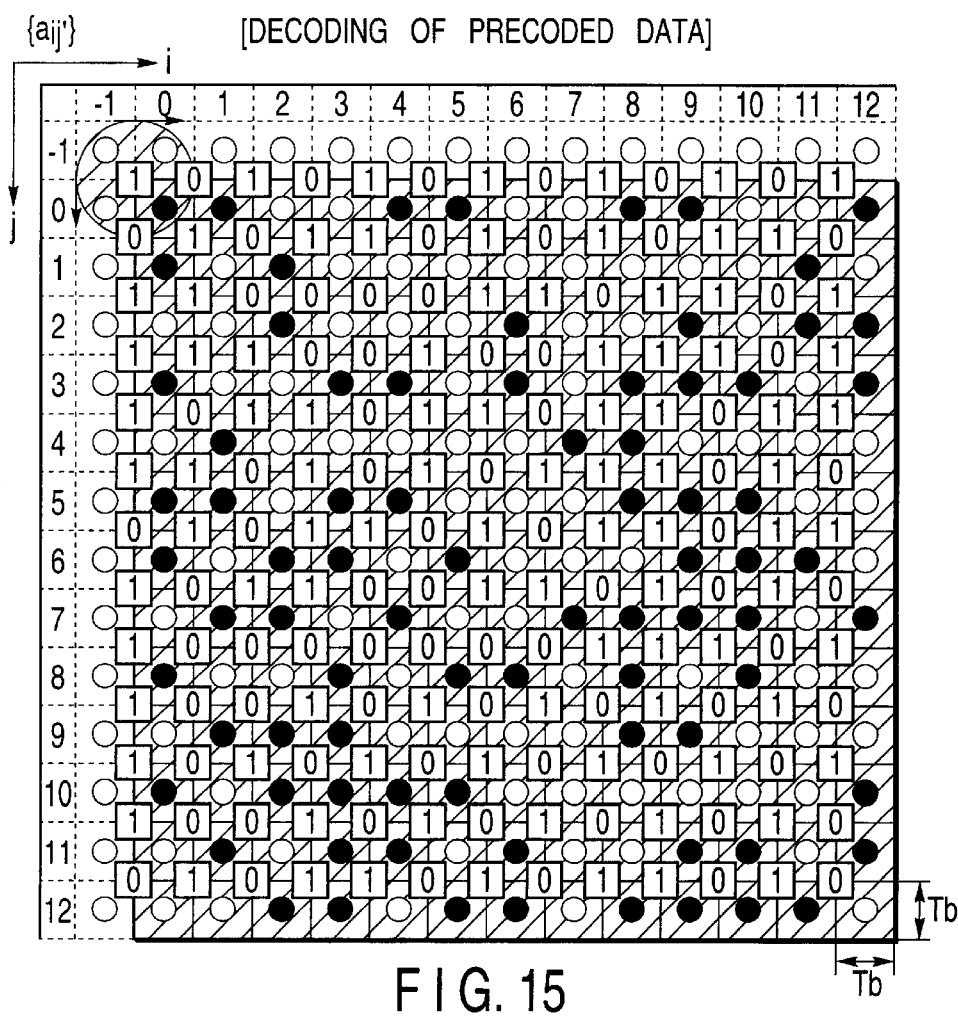
FIG. 15 is a view showing the relation of the data series as a result of decoding in the decoding portion in FIG. 9 with the recorded dots.

And, the code image recorded on the recording medium is picked up in the image pickup portion 15, and, in this embodiment, after the adjacent four dots has been processed by equalization in the PR-equalization portion 17 so that it may be folded well, the value per dot is judged in the reading judgment portion 18 based upon the reading point information detected simultaneously in the reading point calculation portion 16. Basically, as shown in FIG. 13, as a value $\{c_{ij}\}$ representing the sum of adjacent four dots, five values of "0", "1", "2", "3" and "4" are obtained in this example and is outputted as a read value. In the decoding portion 19, this read $\{c_{ij}\}$ is, as shown in FIG. 14, judged and decoded based upon the decoding rules, and is converted into a data series $\{a_{ij'}\}$ having a value of "1" or "0". The result of the conversion is shown in FIG. 15 and is identical with the original input data $\{a_{ij}\}$.

When these principles are described in mathematical expressions, the precode processing is represented in the expression (7), and the way of reading, detection, judgment and decoding is developed in the following expression (8). As a result thereof, it can be proved that theoretically the input data series is restored perfectly.

$$\begin{aligned}
a_{ij'} &= [c_{ij}] \bmod 2 \\
&= [b_{ij}+b_{(i-1)j}+b_{i(j-1)}+b_{(i-1)(j-1)}] \bmod 2 \\
a_{ij'} &= \{a_{ij}\oplus b_{(i-1)j}\oplus b_{i(j-1)}\oplus b_{(i-1)(j-1)}\} \\
&\quad \oplus b_{(i-1)j}\oplus b_{i(j-1)}\oplus b_{(i-1)(j-1)}\} \\
&= a_{ij}\oplus\underline{1} \\
&= a_{ij}
\end{aligned}$$

$\oplus$ represents an exclusive or, and mod2 represents a remainder operation of modulo 2.)

Moreover, as a variant of the present invention, a data recording method without performing a precode processing is also conceivable. In this case, a data series $\{a_{ij}\}$ shown in FIG. 10 is inputted, recorded, transmitted, and detected simply as the sum of the values of the four adjacent dots $a_{ij}$, $a_{(i-1)j}$, $a_{i(j-1)}$ and $a_{(i-1)(j-1)}$. As a method of restoring the data series, since the initial value is defined as $\{a_{ij}=0|i=-1\}$ and $\{a_{ij}=0|j=-1\}$, $a_{ij}$ can be calculated by subtracting $a_{(i-1)j}$, $a_{i(j-1)}$ and $a_{(i-1)(j-1)}$ from the sum of the four adjacent dots ($=a_{ij}+a_{(i-1)j}+a_{i(j-1)}+a_{(i-1)(j-1)}$) on occasion.

Further, in this embodiment, the transmission path characteristics folding the four adjacent dots are shown as an example, however, the number of the dots is not limited to four, and it is without saying that the folding of any number of dots according to the transmission path characteristics can be expected.

Second Embodiment

Now, the second embodiment of the present invention will be described with respect to FIGS. 16 to 27.

Figure 16:
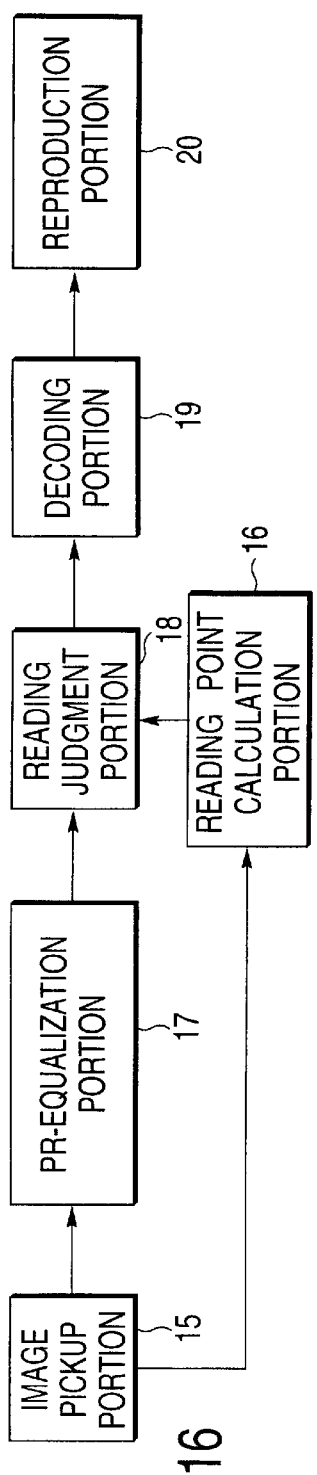
FIG. 16 is a block composition diagram of a system to which the data recording method, the data reproducing method and the data recording medium according to a second embodiment of the present invention are applied.

As shown in FIG. 16, the system to which this second embodiment is applied comprises an image pickup portion 15, a reading point calculation portion 16, a PR-equalization portion 17, a reading judgment portion 18, a decoding portion 19 and a reproduction portion 20.

Now, the effects of this embodiment will be described.

Figure 17:
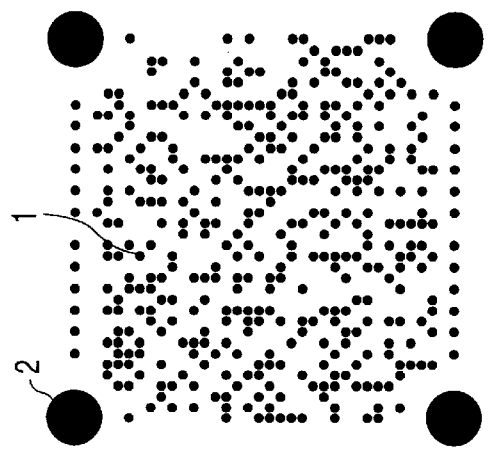
FIG. 17 is a view showing the blocks of the dot code.

First, in the image pickup portion 15, a dot code recorded optically according to a predetermined format is picked up by means of a CCD or the like, and is converted into an electric signal. Here, the dot code is, as shown in FIG. 17, composed of markers 2 determining the data reading points and data dots 1 corresponding to the information to be recorded.

Figure 18:
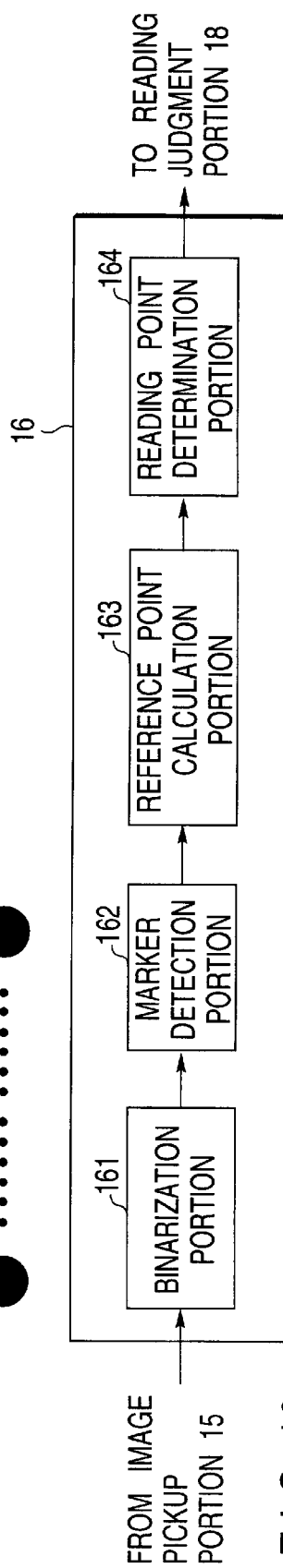
FIG. 18 is a block diagram showing the composition of the reading point calculation portion in FIG. 16.
Figure 19:
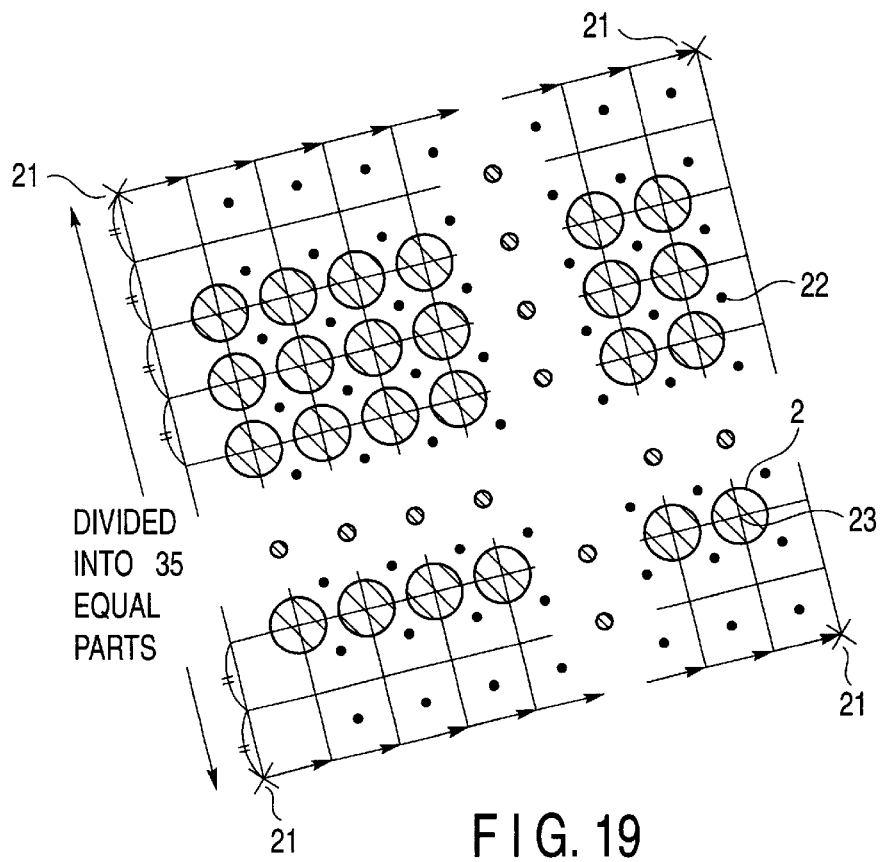
FIG. 19 is a view for illustrating the data reading points calculated in the reading point determination portion in FIG. 18.

Next, in the reading point calculation portion 16, the data reading points are calculated based upon the positions of the markers 2. This reading point calculation portion 16 can, as shown in FIG. 18, comprise a binarization portion 161, a marker detection portion 162, a reference point calculation portion 163 and a reading point determination portion 164. That is, first, in the binarization portion 161, a dot code picture picked up in the image pickup portion 15 is binarized, and in the marker detection portion 162, the markers 2 are detected by detecting black runs of a predetermined length showing the markers 2. Next, in the reference point calculation portion 163, the central positions of the markers 2 are calculated based upon the connection of the detected black runs, and these central positions are used as reference points. And, in the reading point determination portion 164, based upon the format of the dot code and upon the positional relation of the recording points with the data reading point determined by the PR-equalization characteristics as described below, the data reading point positions are calculated from the reference points at the four corners representing the central positions of the markers. For example, when setting a data reading point at the center of the four adjacent recording points in the dot code where data dots 1 are recorded on the square grid having 35 dots between the centers of the markers as shown in FIG. 17, the center of each grid divided into 35 equal parts between the reference points 21 representing the centers of the markers is determined as a data reading point 22, as shown in FIG. 19. Moreover, it is without saying that various known methods of determining a data reading point 22 can be used according to the format of the dot code.

In the reader according to the present invention, in order to secure a compatibility in reading a dot code recorded according to the present invention and a conventional dot code (recording point=reading point), it is desirable to record a dot for distinguishing between the dot codes in a predetermined area of each code. And, in the reader, the dot is read first, it is judged to which dot code the dot belongs, and the data reproducing method is changed over according to the result of the judgment. Moreover, if the markers and the dot used for changing over the data reproducing method have a size not influenced by interference described below in recognizing them, a deterioration in recognition due to interference van be prevented.

Figure 20:
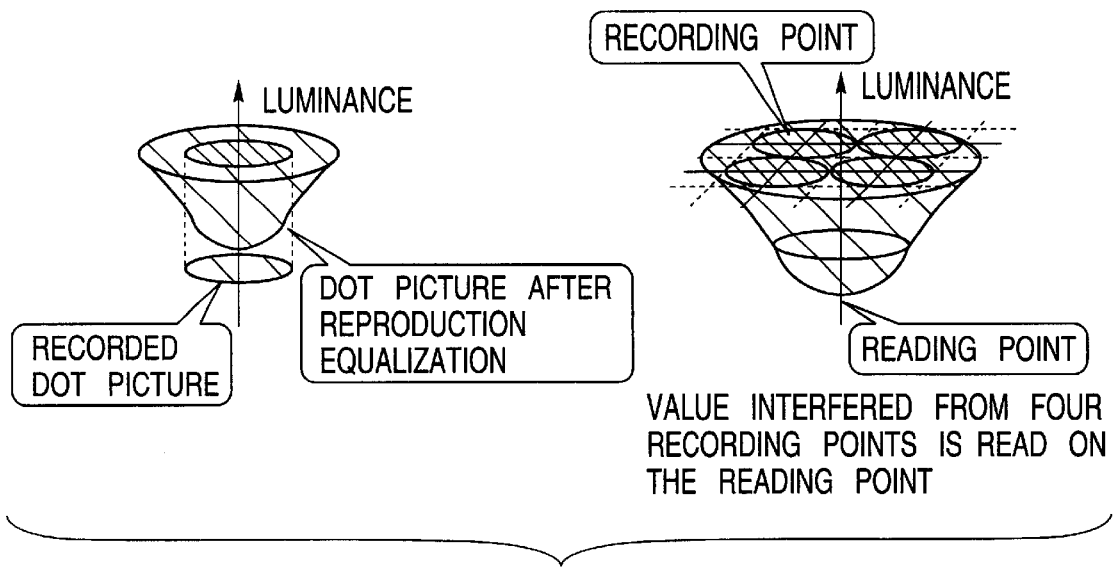
FIG. 20 is a view for illustrating the operation of the PR-equalization portion in FIG. 16.

Next, in the PR-equalization portion 17, based upon the recording characteristics of the dot code and the characteristics of the image pickup portion 15, a PR- equalization is performed so that a predetermined interference is given from the recording points to the reading point 22. Here, the PR-equalization is not a usual equalization shaping wave forms so that the characteristics at the recording point 23 may be the original recording characteristics, but an equalization shaping wave forms so that the characteristics at the reading point 22 may be the designed predetermined PR characteristics. For example, if a dot code picture is defocused due to the characteristics of the image pickup portion 15, the equalization emphasizing a high pass will emphasize noise components in the high frequency range, and therefore, a PR-equalization preventing this shall be performed. For example, if a PR-equalization giving interference from four adjacent data dots 1 to the data reading point 22 as shown in FIG. 20 is performed, this PR-equalization is equivalent to a filter processing by a two dimensional low pass filter, and therefore, the PR-equalization can be performed without emphasizing unnecessary noise components in the high frequency range.

Here, the filter used for PR-equalization is designed so as to secure a sufficient quantity of interference for reading and judgment from the recording points which shall give interference to the data reading point 22 and so as to secure a sufficient quantity of attenuation for not influencing reading and judgment from the recording points which shall not give interference to the data reading point 22. That is, as shown in FIG. 21, when it is desired to give interference of not less than 50% from the recording point A and to give no interference from the recording point B, the filter characteristics are designed in a range of the characteristic A to the characteristic B shown in the figure. Moreover, this filter processing may be performed electrically after image pickup, optically by using the defocusing of the lens before image pickup, or in combination thereof. When the PR-equalization is performed by an electrical filter processing, the design of the filter becomes easier, and when the PR-equalization is performed by an optical filter processing, a higher-speed filter processing becomes possible.

Further, several different examples of the dot code format and the PR-equalization characteristics are shown in FIGS. 22 to 24. FIG. 22 shows a case in which four dots adjacent to the data reading point interfere, FIG. 23 shows a case in which three dots adjacent to the data reading point interfere, and FIG. 24 shows a case in which seven dots adjacent to the data reading point interfere, and these figures show an area in which a circle of solid line gives a sufficient quantity of interference and an area in which a circle of broken line secures a sufficient quantity of attenuation respectively. As described above, the PR-equalization characteristics and the positioning of the data reading points can be set properly according to the characteristics of the recording/reproduction system and the format of the dot code.

Further, in picking up the low-pass characteristics due to a mainly optical defocus of the recording/reproduction system may make the picture of the recorded dots in FIG. 25 a picture as shown in FIG. 26 (however, in FIG. 26, the picture is expressed in five gradations for convenience' sake, and a circle in the figure is drawn so that the position of the original dot can be identified). Also in this case, by using the low-pass characteristics positively, the reading can be performed. That is, if the low-pass characteristics in this case are equalized to the PR-equalization characteristics in FIG. 20 by the PR-equalization, quite the same method of reading can be applied. Actually the low-pass characteristics in FIG. 26 are the same as the PR-equalization characteristics in FIG. 20, and in this case the PR-equalization portion can be omitted.

Next, in the reading judgment portion 18, values after being equalized in the PR-equalization portion 17 are read at the data reading point 22 calculated in the reading point calculation portion 16 and they are judged multinarily. The threshold values of this multinary judgment depend upon the number of the recording points 23 giving interference to the data reading point and upon the quantity of interference, and if the quantity of interference is equal, a (number of recording points +1) value judgment by the same number of the threshold values as the recording points 23 giving interference is made. That is, if adjacent four dots give interference equally, a quinary judgment by four threshold values may be made, and if the value of the data reading point 22 in case of interference given only by one dot is expressed in V, these threshold values may be set to 0.5V, 1.5V, 2.5V and 3.5V.

Next, the multinary data judged in this way are decoded to binary data in the decoding portion 19. As the simplest method, the data are decoded sequentially from the end of the data, and the values at the data reading point 22 and the already decoded data are decoded to the original binary data sequentially, however, by applying a precode as described in the first embodiment to the judged multinary data in advance and recording the multinary data, it is also possible to decode the multinary data easily to the original binary data by calculating the remainder between the multinary data and two.

Figure 27:
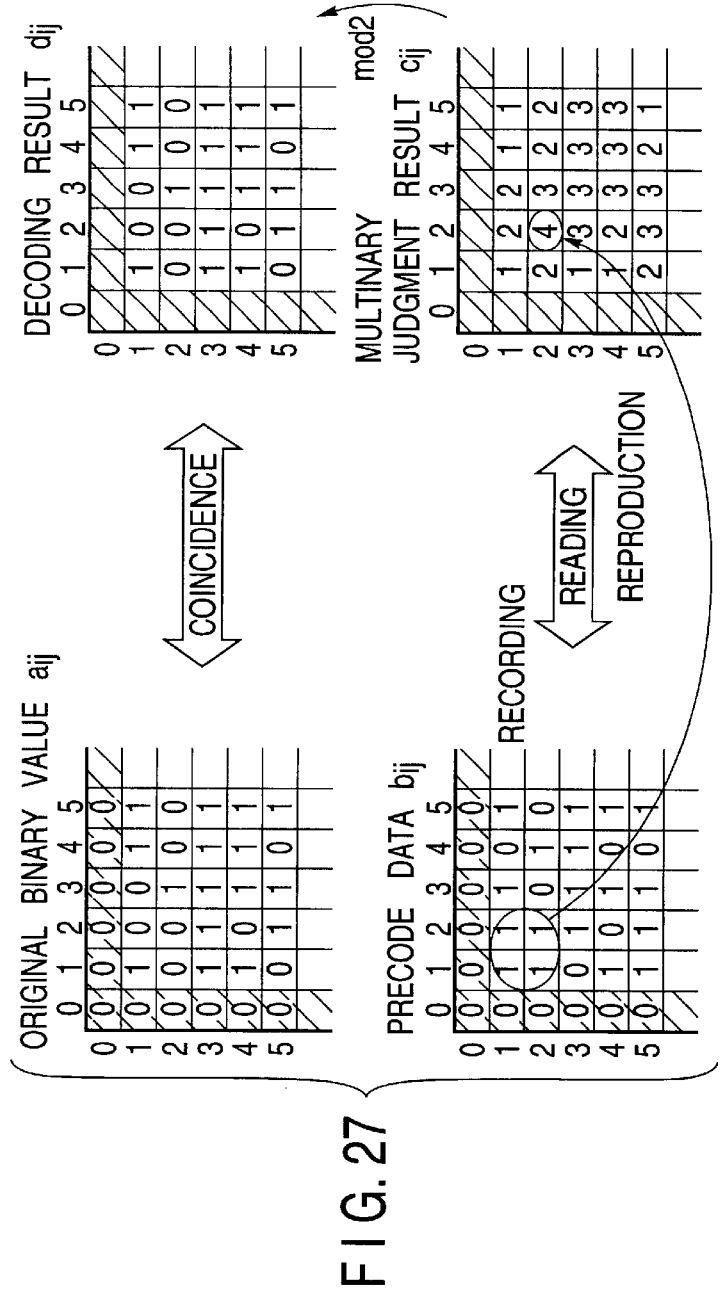
FIG. 27 is a view showing an example of the data series of the original binary data, the precode data, the result of multinary judgment and the result of decoding for illustrating the operation of the second embodiment.

This situation will be described with reference to FIG. 27. In this FIG. 27, the upper left figure shows the original binary data, and by applying a mod2 addition of four adjacent dots to such an original data, the data are precoded as shown in the lower left figure and recorded. When the data are judged multinarily at the data reading points 22 after the above-described PR-equalization in FIG. 20 has been applied, multinary data as shown in the lower right figure is obtained. When the remainder between the multinary data and two is found, binary data as shown in the upper right figure are obtained, and these data are identical to the original binary data.

Next, in the reproduction portion 20, based upon the binary data decoded in this way, demodulation corresponding to the modulation which has been applied in recording and coding, error correction and the like are performed, and the recorded original information is reproduced.

In this way, by recording beforehand precoded data, an easy and reliable reproduction becomes possible without being interfered by the result of reproduction of adjacent reading points 22, that is, without propagating a reproduction error, if any. Moreover, by decoding judged multinary data to the original binary data sequentially, no multinary data memory is required, and a sequential reproduction is also possible simultaneously with reading.

In this way, according to the present invention, by using a two dimensional interfere from the adjacent data dots 1 positively, data is reproduced, and therefore, data having a higher recording density than the conventional reproduction method can be reproduced without emphasizing unnecessary noise components for removing interference as in the conventional methods.

Moreover, by setting the PR-equalization characteristics and the positions of the data reading points 22 so that the position, the number and the quantity of interference of the data dots 1 giving interference to the data reading point 22 may be as predetermined, an easy and reliable reproduction is possible with predetermined noise components being suppressed. In particular, by locating the reading point 22 in the center of four dots located in the 2×2 grids, the quantity of interference from each dot can be equalized, and an easy reproduction becomes possible.

Moreover, a great effect of the present invention is that the operability in reading by a manual scanning is not impaired by not increasing the image pickup magnification even if the recording density of the dot code is increased.

Figure 28:
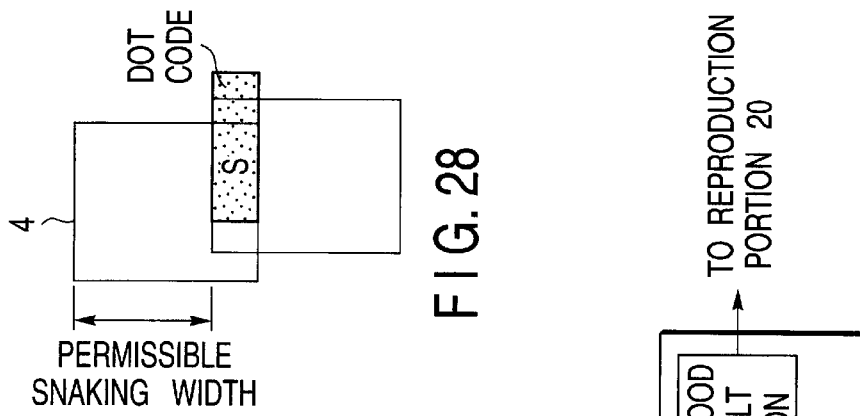
FIG. 28 is a view showing the relation of the dot with the image pickup area and the permissible snaking width when the present invention is applied.

That is, as described above with reference to FIGS. 3 to 6, the operability by a manual scanning is impaired remarkably if the reading resolution is increased corresponding to the reading density, and if a redundant recording is made in order to prevent this, the occupancy area can not be reduced with the same efficiency even with an increased recording density. However, since reading is possible without changing the reading resolution according to the present invention, a dot code with a quadrupled recording density can be read without increasing the image pickup magnification. In this case, as shown in FIG. 28, since $W_d$ becomes 2 mm with $W_c$ remaining 8 mm, the permissible snaking width W is $W_c-W_d$ =6 mm. Since this satisfies a permissible snaking area of 6 mm, it is not necessary to record the code twice, and since the occupancy area in a manual scanning is S, the substantial recording area can be reduced to ⅛ by quadrupling the recording density. That is, a high density recording becomes possible without impairing the operability in reading by a manual scanning.

Third Embodiment

Now, a third embodiment of the present invention will be described with respect to FIGS. 16 and 29 to 41.

Figure 29:
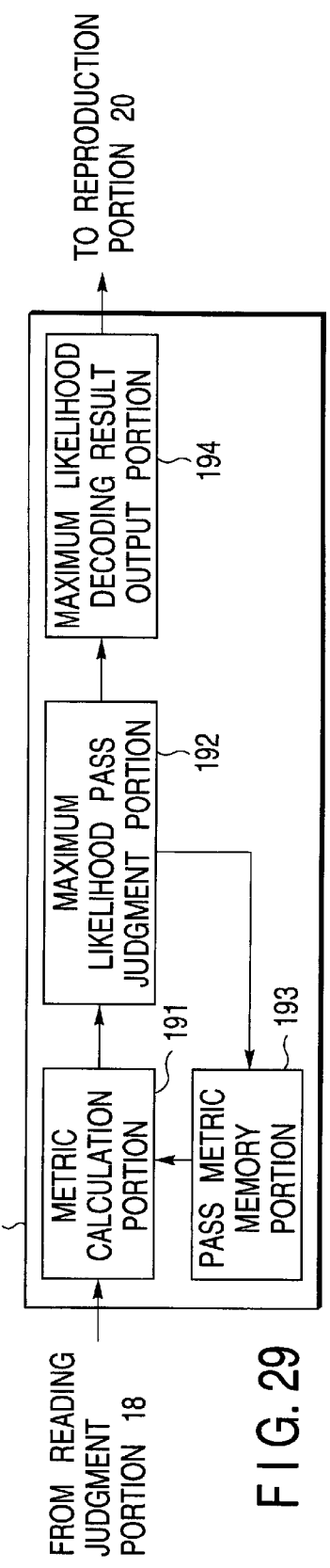
FIG. 29 is a block diagram showing the composition of the decoding portion in a third embodiment of the present invention.

In this embodiment, the decoding portion 19 in FIG. 16, as shown in FIG. 29, comprises a metric calculation portion 191, a maximum likelihood pass judgment portion 192, a pass metric memory portion 193 and a maximum likelihood decoding result output portion 194.

Next, the effects and advantages of this embodiment will be described, however, the description of the identical portions with the above-described second embodiment will be omitted because they have the identical effects and advantages, and only the decoding portion 19 will be described.

Here, a case in which such data as shown in the left figure of FIG. 30 are recorded and reproduced will be described. In this case, "1" or "0" of the recorded data is recorded by letting the "1" or "0" to the existence or non-existence of a dot, as shown in FIG. 31, and in the neighborhood a dot in the predetermined state, for example, a dot corresponding to "0" is recorded. In the following, as an example, a case in which a recording medium having recorded such dots is read by giving interference so that adjacent four dots may be convolved will be described.

Now, as shown in FIG. 30, the i-th pair of the recorded data is expressed in a code $S_i$, and the i-th pair of the results of the multinary judgment in the reading judgment portion 18 is expressed in a code $C_i$, wherein the code $S_i$ is defined as shown in FIG. 32.

And, as the results of the multinary judgment, since, for example, a secondary code $c_2$ convolves adjacent four dots, the code $c_2$ is determined by the eight dots among the 3×3 dots in the upper left except the top left dot in the recorded data $S_i$, however, since dots corresponding to "0" are recorded except a secondary code $S_2$, $c_2$ is determined only by the status of $S_2$. Actually, a quintanary judgment is made at each data reading point, there are $5^3$ kinds of secondary codes $C_i$ determined by the values at three reading points, however, by taking the original data into consideration like this, as shown in FIG. 33, there are actually only $2^3$ kinds of appearing codes. This is why the codes are limited by convolving adjacent fixed data "0", what makes a kind of error correction possible.

In the metric calculation portion 191, the distances between the code $C_i$ and all the possible codes $T_i$ at this time are calculated, there are $2^3$ kinds of $T_2$ in the secondary code $C_2$, as described above, and if any other code has appeared, that is, if a wrong reading judgment has been made, the gap is added as distance.

This metric calculation will be described in detail with FIGS. 34 to 38.

If, for example, data dots are recorded like $S_{2,6}$, as shown in FIG. 34, the result of having convolved adjacent four dots is like $T_{2,6}$. By calculating the distance between this and the actual result of the reading judgment $C_2$ (sum of the gaps of the values detected at three data reading points respectively), d=1 is obtained, and with respect to the pattern $S_{2,6}$ the distance d=1 is calculated as metric. This is found with respect to all the patterns $S_{2,j}$ (j:0 to 7 (eight kinds)), and is stored in the pass metric memory portion 193.

Figure 36:
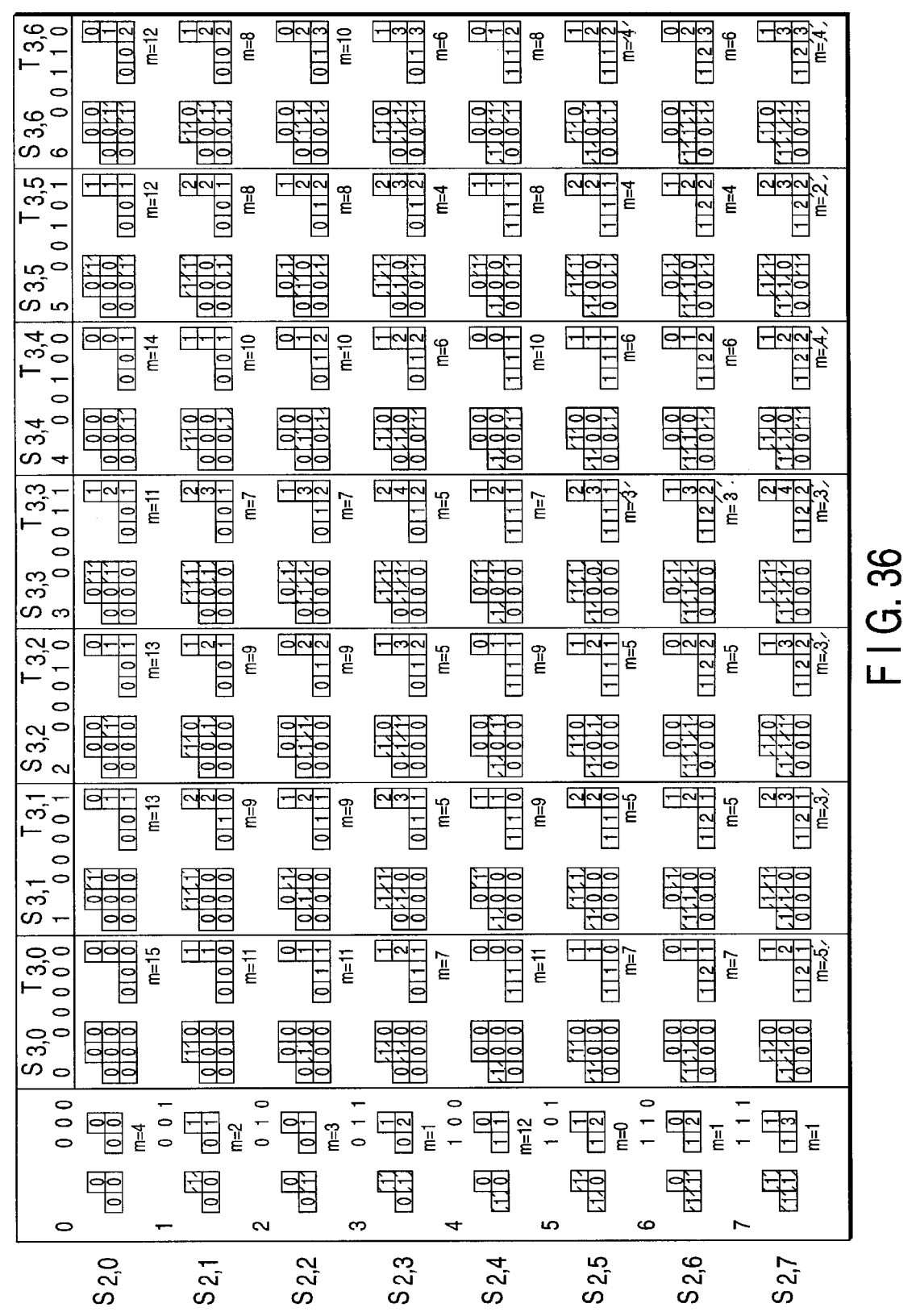

Next, also with respect to tertiary codes as patterns following this, the distances are found similarly. For example, as shown in FIG. 35, if dots are recorded like $S_{3,5}$ following $S_{2,6}$ the result of convolution is like $S_{3,5}$, and by calculating the distance between this and the actual result of the reading judgment $C_3$, d=3 is obtained, and in the transition $S_{2,6}$ to $S_{3,5}$ 1+3=4 is calculated as metric. This is found with respect to all the patterns $S_{3,j}$(j:0 to 31 (32 kinds)), and is stored in the pass metric memory portion 193. A part thereof is shown in FIG. 36. For example, in the transition $S_{2,5}$ to $S_{3,4}$ m=6 is obtained.

If all the pass metrics are calculated in this way, the result is as shown in FIG. 37.

Figure 38:
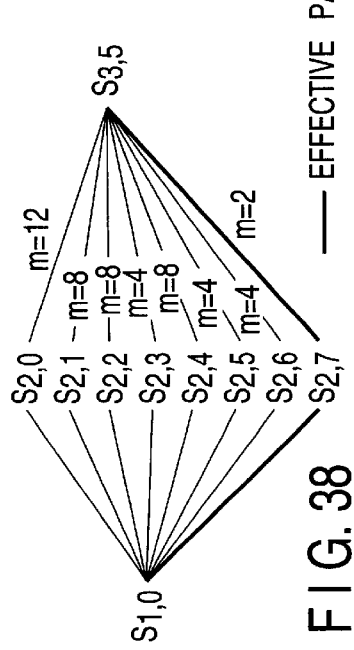
FIG. 38 is a view showing the pass and the metric thereof by representing the transition of the code on the longitudinal axis with respect to the transition to the tertiary code $S_{3,5}$.
Figure 40:
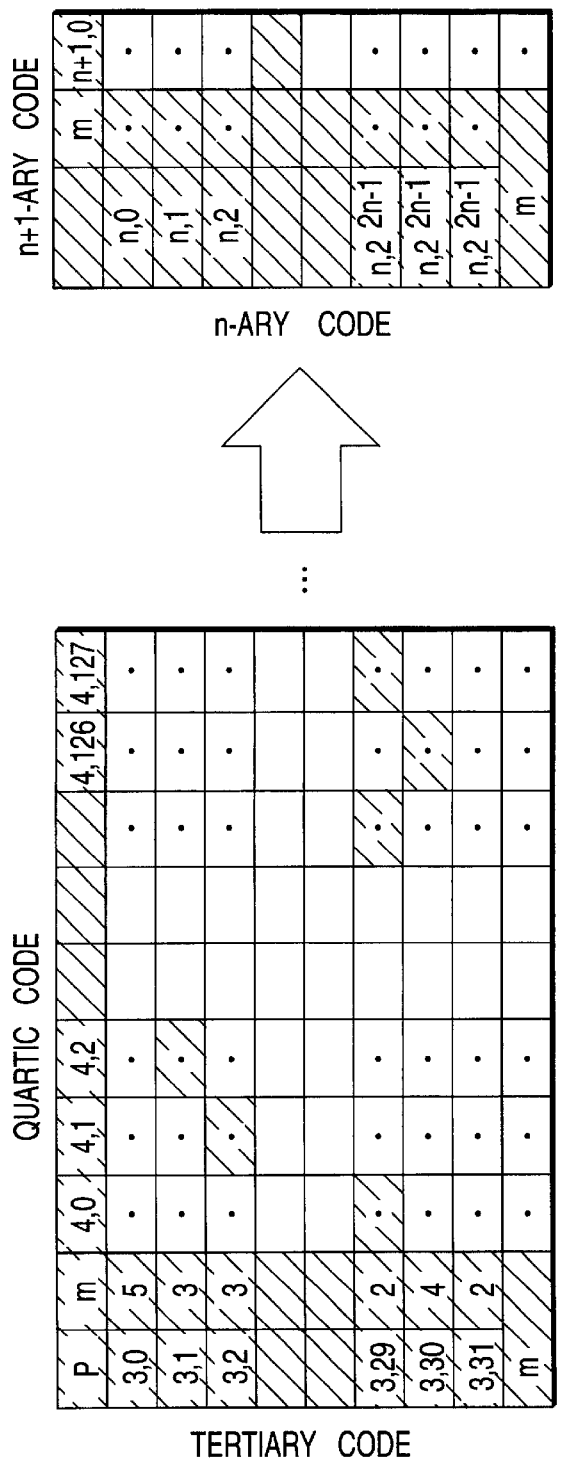
FIG. 40 is a view for illustrating the convergence at the last (n+1)-ary codes.

Here, the passes and the metrics thereof illustrated by representing the transition of the codes with respect to the transition to $S_{3,5}$ on the transverse axis are shown in FIG. 38. In the figure, eight passes merge at $S_{3,5}$, and the passes begin at $S_{1,0}$ and merge at $S_{3,5}$. That is, among the passes having the same point of beginning and the same point of end, passes having a large metric (having a small likelihood) have no possibility of being passes having the maximum likelihood and can be omitted from the subsequent search. Further, if $S_1$ is fixed in advance in a predetermined status, for example, in $S_{1,0}$, there is only one point of beginning, and therefore, among the passes going through $S_{3,5}$, only a pass having the smallest metric at this time can be kept as a pass to be searched. That is, when calculating metrics by quartic codes subsequently, a metric has to be calculated only with a pass having the smallest metric in each tertiary code, and other passes can omitted from a subject of metric calculations.

Now, in the maximum likelihood pass judgment portion 192, a pass having the smallest metric in each tertiary code is judged, and the pass and the metric thereof are stored in the pass metric memory portion 193. For example, with respect to eight passes to $S_{3,5}$, the small metrics is 2 in the pass from $S_{2,7}$ to $S_{3,5}$ and $S_{2,7} \rightarrow S_{3,5}(m_{3,5}=2)$ is stored in the pass metric memory portion 193.

As described above, in the maximum likelihood pass judgment portion 192, in an i-ary (i-th degree) codes $S_{1,j}$, a pass having the smallest pass is selected among the (i−1)-ary codes $S_{i-1,k}$, and the pass $(S_{i-1,k} \rightarrow S_{i,j})$ and the metric $(m_{i,j})$ are stored in the pass metric memory portion 193. Moreover, if there are a plurality of passes having the identical smallest metrics, all the passes are stored as candidates. This is shown with a net in FIG. 37.

Figure 39:
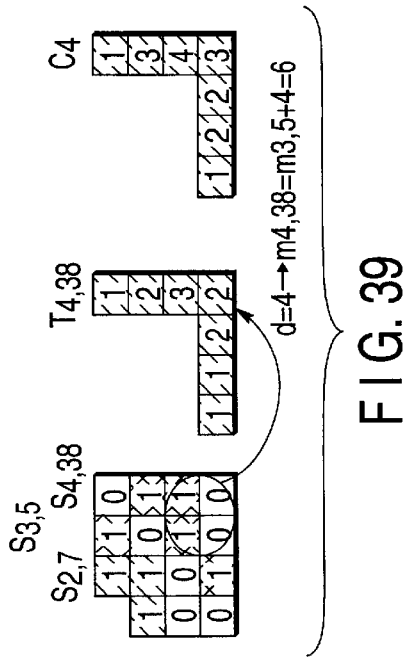
FIG. 39 is a view for illustrating the metric in the transition from $S_{3,5}$ to $S_{4,38}$.

Now, the transition to quartic codes will be described. If data dots transiting from $S_{3,5}$ to $S_{4,38}$ have been recorded as shown in FIG. 39, the result of convolution is like $S_{4,38}$, and by calculating the distance between this and the actual result of the reading judgment $C_4$, d=4 is obtained, and in the transition from $S_{3,5}$ to $S_{4,38}$, $m_{4,38}=m_{3,5}+4=6$ is calculated as a metric. This is found with respect to all the patterns $S_{4,j}$ (j:0 to 127 (128 kinds)), and the smallest metric and the pass thereof are stored respectively in the pass metric memory portion 193.

Subsequently, this process is repeated, however, since all the elements are set to "0" finally in the (n+1)-ary codes, the codes converge to one code, and a pass having the smallest metric is the decoding result having the maximum likelihood. This is shown in FIG. 41 with the transition of the codes being represented on the transverse axis.

Since the code series having the maximum likelihood is searched effectively by using a trellis, this method can be considered to a two-dimensionally extended Viterbi decoding method which is one of the maximum likelihood decoding methods.

Moreover, when calculating metrics of the quartic codes, it is clear from FIG. 37 that only $S_{2,3}$, $S_{2,5}$, $S_{2,6}$, and $S_{2,7}$ are left as effective passes, however, when the decoding proceeds further, the front parts of the passes converge to one. This is a part of the maximum likelihood pass and can be outputted as a result of decoding.

As described above, according to the third embodiment, not only the effects of the present invention are obtained, but also a very reliable decoding result can be obtained with errors in decoding being prevented by selecting a decoding result having the maximum likelihood with respect to a data series having a correlation between adjacent data given by interference by using this correlation. Further, by searching this code series of the maximum likelihood by using a trellis according to the Viterbi algorithm, an effective maximum likelihood decoding becomes possible.

Further, by setting a data fixing area adjacent to the locating area of data dots, the status at the reading point interfered by the data fixing area is limited in reproducing data, and the reproduction becomes easier. In particular, by regulating the status of the reading starting point, it becomes easier to omit low likelihood passes in searching passes, and large effects can be obtained in speed-up of processing and in reduction in memory.

Moreover, as a variant to this embodiment, a case in which the format is different will be described.

In FIG. 42 data dots are located so that an increase in width in a diagonal direction with respect to the format may be limited. If the maximum likelihood decoding is performed by a PR-equalization convolving adjacent four dots in such a format, a trellis as shown in FIG. 43 is generated. As is clear from this FIG. 43, since only $2^5$ kinds of codes determined by the status of five dots after $C_3$ in this example, the largest number of passes is limited to $2^5$, and a limited memory of the pass metric memory portion 193 can be used effectively.

And further, by laying down transition rules in the transition from the code $S_i$ to the code $S_{i+1}$, an error correction capability can be also added. For example, by prohibiting the transition from a odd number to the odd number and the transition from an even number to the even number, as shown in FIG. 44, selectable passes are reduced to one half, the redundancy is increased, however, the error correction capability is increased, and the memory can be also reduced.

Further, in the examples up to here, a format locating data dots on square grids has been mainly described, however, it is without saying that any other format can be applied.

For example, as shown in FIG. 45, in a format locating data dots in a triangle, a PR-equalization giving interference so that adjacent three dots may be convolved is effective, and by setting the data reading points as shown in FIG. 23, data are read by a quaternary judgment. Based upon this reading result, a trellis is generated in FIG. 46, and only a pass having the maximum likelihood has to be searched as in the above-described examples.

Now, the present invention has been described based upon the above-described embodiments, however, the present invention is not limited to the above-described embodiments, and various modifications and applications are possible within the scope of the summary of the present invention. Here, the present invention is summarized as follows:

(1) A data recording method for recording data to be recorded as an optically readable image on a recording medium by letting "1" or "0" correspond to existence or non-existence of a fine dot having predetermined reflection characteristics respectively and by arranging the dot corresponding to the data according to a predetermined format in the two dimension, the data recording method comprising the steps of:

inputting data to be recorded; and recording dots corresponding to the inputted data optically readably so that the data may be reproduced by using a two dimensional interference from the adjacent dots.

That is, according to the aspect described in (1), by using two-dimensional interference from adjacent dots positively in reproducing data, data can be recorded with a higher density than the conventional methods based upon the assumption that interference from each dot is removed.

(2) The data recording method described in (1), wherein the dots are located according to data to be recorded in the square grids formed imaginarily in a matrix-shape on the recording medium respectively, the central position of each grid is used as a recording position, and the dots are recorded so that the data may be reproduced by using interference from each dot located within adjacent n x n pieces of the square grids.

That is, according to the aspect described in (2), by properly limiting the number of dots giving interference in reproducing data, and by adjusting the range in which interference is given to the location of dots, data can be recorded so that they may be reproduced easily and reliably.

(3) The data recording method described in (2), wherein the dots are recorded so that the data may be reproduced by using interference from each dot located within adjacent 2×2 pieces of the square grids.

That is, according to the aspect described in (3), by locating the reading point in the center of four dots located in 2×2 pieces of grids, the quantity of interference from each dot can be equalized, and data can be recorded so that they may be reproduced easily and reliably.

(4) The data recording method described in (1), wherein a two-dimensional precode processing of the data to be recorded corresponding to the way of location of the dots is performed in order to prevent an error propagation in reproducing the data by using two-dimensional interference from the adjacent dots.

That is, according to the aspect described in (4), data can be recorded so that they may be reproduced easily and reliably without being interfered by the result of reproduction of adjacent reading points, that is, without propagating a reproduction error, if any.

(5) The data recording method described in (4), wherein the dots are located according to data to be recorded in the square grids formed imaginarily in a matrix-shape on the recording medium respectively, the central position of each grid is used as a recording position, and the dots are recorded so that the data may be reproduced by using interference from each dot located within adjacent 2×2 pieces of the square grids, and wherein the two-dimensional precode processing is a processing according to $$b_{ij}=a_{ij} \oplus b_{(i-1)j} \oplus b_{i(j-1)} \oplus b_{(i-1)(j-1)}$$

($\oplus$ represents an exclusive or.)
if $a_{ij}$ represents the data to be recorded, and $b_{ij}$ represents the data after precode processing.

That is, according to the aspect described in (5), by a simple operation such as the above expression, data can be recorded so that they may be reproduced easily and reliably without being interfered by the result of reproduction of adjacent reading points.

(6) A data reproducing method for reproducing data by reading fine dots having predetermined reflection characteristics from a recording medium on which data to be recorded is recorded as an optically readable image by letting "1" or "0" correspond to existence or non-existence of the dot respectively and by arranging the dot corresponding to the data according to a predetermined format in the two dimension, the data reproducing method comprising the steps of:

picking up the dots from the recording medium by a manual scanning operation; and reproducing the data from the data of the dots obtained by the pickup by using a two-dimensional interference of the dots located adjacently in the two dimension.

That is, according to the aspect described in (6), by using two-dimensional interference from adjacent dots positively in reproducing data, data can be recorded with a higher density than the conventional methods based upon the assumption that interference from each dot is removed.

(7) The data reproducing method described in (6), wherein a two-dimensional partial response equalization is performed in order to set the reading points of the data so that it may have a predetermined positional relation with the recording point of the dots and in order to give a predetermined quantity of interference from adjacent dots to the reading points.

That is, according to the aspect described in (7), by setting the number of dots and the interference quantity thereof properly, data can be reproduced easily and reliably.

(8) The data reproducing method described in (7), wherein the two-dimensional partial response equalization is an electrical filter processing.

That is, according to the aspect described in (8), the filter can be designed more easily by performing a partial response equalization by an electrical filter processing in any portion following the image pickup portion.

(9) The data reproducing method described in (7), wherein the two-dimensional partial response equalization is an optical filter processing.

That is, according to the aspect described in (9), by performing a partial response equalization by an optical filter processing in any portion preceding to the image pickup portion, the electrical processing becomes easier and the speed-up becomes possible.

(10) The data reproducing method described in (6), wherein the dots are located according to data to be recorded in the square grids formed imaginarily in a matrix-shape on the recording medium respectively, the central position of each grid is used as a recording position, and wherein the data are reproduced by using interference from each dot located within adjacent n×n pieces of the square grids.

That is, according to the aspect described in (10), by properly limiting the number of dots giving interference in reproduction, and by adjusting the range in which interference is given to the location of dots, data can be recorded so that they may be reproduced easily and reliably.

(11) The data reproducing method described in (10), wherein the dots are recorded so that the data may be reproduced by using interference from each dot located within adjacent 2×2 pieces of the square grids.

That is, according to the aspect described in (11), by locating the reading point in the center of four dots located in 2×2 pieces of grids, the quantity of interference from each dot can be equalized, and data can be reproduced easily and reliably.

(12) The data reproducing method described in (6), wherein when a two-dimensional precode processing of the data to be recorded corresponding to the way of location of the dots is performed in order to prevent an error propagation in generating data by using two-dimensional interference from the adjacent dots, the reproduced data are processed further by decode corresponding to the two-dimensional precode processing.

That is, according to the aspect described in (12), data can be reproduced easily and reliably without being interfered by the result of reproduction of adjacent reading points, that is, without propagating a reproduction error, if any.

Moreover, since there is no interference due to the result of reproduction of adjacent reading points, data can be sequentially reproduced simultaneously with the reading thereof.

(13) The data reproducing method described in (6), wherein the data are reproduced by using a two-dimensional maximum likelihood decoding method.

That is, according to the aspect described in (13), by selecting a decoding result having the maximum likelihood with respect to a data series having a correlation between adjacent data given by interference by using this correlation, errors in decoding are prevented, and a very reliable decoding result can be obtained.

(14) The data reproducing method described in (13), wherein the two-dimensional maximum likelihood decoding method is a two-dimensional Viterbi decoding method.

That is, according to the aspect described in (14), the code series of the maximum likelihood can be searched effectively in reproducing data by using a trellis according to the Viterbi algorithm.

(15) A recording medium on which data to be recorded are recorded as an optically readable image by letting "1" or "0" correspond to existence or non-existence of a fine dot having predetermined reflection characteristics respectively and by arranging the dot corresponding to the data according to a predetermined format in the two dimension, the recording medium comprising:

a location area for locating the dots; and the dots recorded within the location area, wherein the dots are recorded optically readably so that the recorded data may be reproduced by using a two-dimensional interference from the adjacent dots.

That is, according to the aspect described in (15), by using two-dimensional interference from adjacent dots positively in reproducing data, data can be recorded with a higher density than the conventional methods based upon the assumption that interference from each dot is removed.

(16) The recording medium described in (15), wherein a data fixing area having fixed values of data is set adjacent to the locating area of data dots.

That is, the status at the reading point interfered by the data fixing area can be limited in reproducing data, and data can be recorded so that they may be generated easily and reliably.

Moreover, the above-described aspects can be combined with each other as much as possible.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data recording method for recording data to be recorded as an optically readable image on a recording medium by making "1's" and "0's" included in the data correspond to existence and non-existence of fine dots having predetermined reflection characteristics, respectively, and by two-dimensionally arranging the dots according to the data in a predetermined format, said data recording method comprising:

inputting the data to be recorded; and performing a two-dimensional precode processing on the input data, when dots according to the input data are optically readably recorded such that the data is allowed to be reproduced by utilizing an optical two-dimensional interference from adjacent ones of the dots, wherein the two-dimensional precode processing corresponds to an arrangement of the dots, and prevents a two-dimensional error propagation from occurring when the data is reproduced by utilizing the optical two-dimensional interference, and wherein the two-dimensional precode processing includes processing for performing an exclusive-OR operation between the input data and data regarding dots adjacent to the dots according to the input data, and the data regarding the dots is already subjected to the two-dimensional precode processing.

2. The data recording method according to claim 1, wherein the dots are located according to the data to be recorded in squares imaginarily formed in a matrix on the recording medium, a central position of each of the squares is used as a recording position, and the dots are recorded such that the data is allowed to be reproduced by utilizing the optical two-dimensional interference from each of dots located in n×n adjacent squares included in the squares.

3. The data recording method according to claim 2, wherein when the n×n adjacent squares are 2×2 squares, and the two-dimensional precode processing satisfies:

$$b_{ij} = a_{ij} \oplus b_{(i-1)(j-1)} \oplus b_{(i-1)j} \oplus b_{i(j-1)}$$

where $a_{ij}$ is the input data, $b_{ij}$ is the data subjected to the precode processing, and $\oplus$ represents an exclusive-OR.

4. A data recording method for recording data to be recorded as an optically readable image on a recording medium by making "1's" and "0's" included in the data correspond to existence and non-existence of fine dots having predetermined reflection characteristics, respectively, and by two-dimensionally arranging the dots according to the data in a predetermined format, said data recording method comprising:

inputting the data to be recorded; and performing a two-dimensional precode processing on the input data, when dots according to the input data are optically readably recorded such that the data is allowed to be reproduced by utilizing an optical two-dimensional interference from adjacent ones of the dots, wherein the two-dimensional precode processing corresponds to an arrangement of the dots, and prevents a two-dimensional error propagation from occurring when the data is reproduced by utilizing the optical two-dimensional interference, and wherein the dots are located according to the data to be recorded in squares imaginarily formed in a matrix on the recording medium, a central position of each of the squares is used as a recording position, and the dots are recorded such that the data is allowed to be reproduced by utilizing the optical two-dimensional interference from each of dots located in 2×2 adjacent squares included in the squares, and wherein the two-dimensional precode processing satisfies:

$$b_{ij} = a_{ij} \oplus b_{(i-1)(j-1)} \oplus b_{(i-1)j} \oplus b_{i(j-1)}$$

where $a_{ij}$ is the input data, $b_{ij}$ is the data subjected to the precode processing, and $\oplus$ represents an exclusive-OR.

5. A data reproducing method for reproducing data by optically reading fine dots having predetermined reflection characteristics from a recording medium, wherein the data is recorded on the recording medium as an optically readable image by making "1's" and "0's" included in the data correspond to existence and non-existence of fine dots having predetermined reflection characteristics, respectively, and by two-dimensionally arranging the dots according to the data in a predetermined format, wherein a method for recording the data comprises (i) inputting the data to be recorded, and (ii) performing a two-dimensional precode processing on the input data, when dots according to the input data are optically readably recorded such that the data is allowed to be reproduced by utilizing an optical two-dimensional interference from adjacent ones of the dots, wherein the two-dimensional precode processing corresponds to an arrangement of the dots, and prevents a two-dimensional error propagation when the data is reproduced by utilizing the optical two-dimensional interference, and wherein the two-dimensional precode processing includes processing for performing an exclusive-OR operation between the input data and data regarding dots adjacent to the dots according to the input data, and the data regarding the dots is already subjected to the two-dimensional precode processing, said data reproducing method comprising:

picking-up an image of the dots from the recording medium; and performing a decode processing corresponding to the two-dimensional precode processing, when the data is reproduced from data of the dots which is obtained from the picked-up image of the dots, by utilizing the optical two-dimensional interference of the dots.

6. The data reproducing method according to claim 5, wherein a two-dimensional partial response equalization is performed to give a predetermined quantity of interference from adjacent ones of the dots to reading points of the data which are set to have a predetermined positional relationship with a recording point of the dots.

7. The data reproducing method according to claim 6, wherein the two-dimensional partial response equalization comprises an electrical filter processing.

8. The data reproducing method according to claim 6, wherein the two-dimensional partial response equalization comprises an optical filter processing.

9. The data reproducing method according to claim 5, wherein the dots are located according to the data to be recorded in squares imaginarily formed in a matrix on the recording medium, a central position of each of the squares is used as a recording position, and the data is reproduced by utilizing the optical two-dimensional interference from each of dots located in n×n adjacent squares included in the squares.

10. The data reproducing method according to claim 9, wherein when the n×n adjacent squares are 2×2 squares, and the two-dimensional precode processing satisfies:

$$b_{ij}=a_{ij}\oplus b_{(i-1)(j-1)}\oplus b_{(i-1)j}\oplus b_{i(j-1)}$$

where $a_{ij}$ is the input data, $b_{ij}$ is the data subjected to the precode processing, and $\oplus$ represents an exclusive-OR.

11. A data reproducing method for reproducing data by optically reading fine dots having predetermined reflection characteristics from a recording medium, wherein the data is recorded on the recording medium as an optically readable image by making "1's" and "0's" included in the data correspond to existence and non-existence of fine dots having predetermined reflection characteristics, respectively, and by two-dimensionally arranging the dots according to the data in a predetermined format, said data reproducing method comprising:

picking-up an image of the dots from the recording medium; and performing a two-dimensional partial response equalization to give a predetermined quantity of interference from adjacent ones of the dots to reading points of the data which are set to have a predetermined positional relationship with a recording point of the dots, when the data is reproduced from data of the dots which is obtained from the picked-up image of the dots, by utilizing an optical two-dimensional interference of the dots.

12. The data reproducing method according to claim 11, wherein the two-dimensional partial response equalization comprises an electrical filter processing.

13. The data reproducing method according to claim 11, wherein the two-dimensional partial response equalization comprises an optical filter processing.

14. A data reproducing method for reproducing data by optically reading fine dots having predetermined reflection characteristics from a recording medium, wherein the data is recorded on the recording medium as an optically readable image by making "1's" and "0's" included in the data correspond to existence and non-existence of fine dots having predetermined reflection characteristics, respectively, and by two-dimensionally arranging the dots according to the data in a predetermined format, said data reproducing method comprising:

picking-up an image of the dots from the recording medium; and reproducing the data by using a two-dimensional maximum likelihood decoding method, when the data is reproduced from data of the dots which is obtained from the picked-up image of the dots, by utilizing an optical two-dimensional interference of the dots.

15. The data reproducing method according to claim 14, wherein the two-dimensional maximum likelihood decoding method is a two-dimensional Viterbi decoding method.

* * * * *